United States Patent
Maeda

(10) Patent No.: US 7,294,824 B2
(45) Date of Patent: Nov. 13, 2007

(54) LIGHT BEAM SCANNING DEVICE, IMAGE FORMING APPARATUS, AND LIGHT BEAM SCANNING METHOD

(75) Inventor: Katsuhiko Maeda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 16 days.

(21) Appl. No.: 11/036,025

(22) Filed: Jan. 18, 2005

(65) Prior Publication Data

US 2005/0184229 A1  Aug. 25, 2005

(30) Foreign Application Priority Data

Jan. 19, 2004 (JP) ............... 2004-011188

(51) Int. Cl.
*H01J 3/14* (2006.01)
*B41J 2/435* (2006.01)

(52) U.S. Cl. ............ 250/234; 250/236; 347/234; 347/236

(58) Field of Classification Search ........ 250/234–236; 347/234–236, 248, 250
See application file for complete search history.

(56) References Cited

U.S. PATENT DOCUMENTS

| | | | |
|---|---|---|---|
| 6,137,518 A | 10/2000 | Maeda | |
| 6,292,206 B1 | 9/2001 | Takehara et al. | |
| 6,831,672 B2 | 12/2004 | Maeda | |
| 6,833,856 B2 | 12/2004 | Maeda | |
| 2001/0028387 A1* | 10/2001 | Maeda | 347/232 |
| 2003/0001945 A1 | 1/2003 | Maeda | |
| 2003/0030718 A1 | 2/2003 | Maeda | |
| 2004/0095454 A1 | 5/2004 | Maeda | |
| 2004/0160506 A1 | 8/2004 | Maeda | |

FOREIGN PATENT DOCUMENTS

| | | |
|---|---|---|
| JP | 5-96778 | 4/1993 |
| JP | 6-98104 | 4/1994 |
| JP | 2001-66524 | 3/2001 |
| JP | 2002-162586 | 6/2002 |

OTHER PUBLICATIONS

U.S. Appl. No. 11/036,025, filed Jan. 18, 2005, Maeda
U.S. Appl. No. 11/337,616, filed Jan. 24, 2006, Maeda.

* cited by examiner

*Primary Examiner*—Kevin Pyo
(74) *Attorney, Agent, or Firm*—Oblon, Spivak, McClelland, Maier & Neustadt, P.C.

(57) ABSTRACT

A light beam scanning device is disclosed that includes a light emission source to emit a light beam, a deflection part to deflect the emitted light beam in the main scanning direction, first and second light beam detection parts to detect the deflected light beam at first and second positions, respectively, outside an image area on the opposite sides thereof in the main scanning direction, a time difference measurement part to measure the time difference between the light beam detections by the first and second light beam detection parts, and a control part to perform control so as to correct image magnification in the main scanning direction in the image area from the measured time difference. The control part performs control so that the condition of the amount of light at the time of detecting the light beam by the first and second light beam detection parts is constant.

25 Claims, 17 Drawing Sheets

LIGHT BEAM SCANNING DEVICE, IMAGE FORMING APPARATUS, AND LIGHT BEAM SCANNING METHOD

BACKGROUND OF THE INVENTION

1. Field of the Invention

The present invention relates to a light beam scanning device that performs scanning with a light beam from a light source while detecting the light beam, an image forming apparatus, and a light beam scanning method.

2. Description of the Related Art

In general, an image forming apparatus employing a light beam scanning device modulates a light beam by image data, deflects the light beam at constant angular velocity in the main scanning direction by rotating a polygon mirror, and corrects the deflection of constant angular velocity to deflection of constant linear velocity, thereby scanning the surface of a photosensitive body.

However, with respect to the conventional image forming apparatus, there is a problem in that each mass-produced product has different image magnification because of variations in the characteristics of the lens of its light beam scanning device. In particular, in the case of employing a plastic lens, it is very likely that the shape and the refractive index of the plastic lens vary because of variations in ambient temperature or the internal temperature of the apparatus. When such variations in the shape and the refractive index occur, the scanning position on the image surface of the photosensitive body changes, thus preventing a high-quality image from being produced.

Further, in image forming apparatuses employing multiple laser beams and corresponding lenses to form a multicolor image, color misregistration occurs because of their respective magnification errors, so that a high-quality image may not be produced. Accordingly, it is preferable to equalize the image magnifications of the multiple colors.

Therefore, with respect to image forming apparatuses that form images by performing light beam scanning, Japanese Laid-Open Patent Application No. 2001-66524 (Document 1) discloses a technique for correcting image magnification error in the main scanning direction caused by various factors such as variations in ambient temperature and apparatus internal temperature.

According to the technique of Document 1, the time difference between detection of a light beam by first light beam detection means and detection of the light beam by second light beam detection means is calculated (measured) based on the number of counted cycles of a certain clock signal and the relationship in phase between clock signals and light beam detection signals, thereby improving correction accuracy without the necessity of a high-speed clock signal.

Japanese Laid-Open Patent Application No. 2002-162586 (Document 2) discloses an apparatus using multiple light beams in which correction is performed so that the light beams are equalized in intensity when the light beams enter a synchronization detection sensor.

According to the technique disclosed in Japanese Laid-Open Patent Application No. 5-96778 (Document 3), the area other than the image area corresponding to recording paper in the main scanning direction is illuminated with a light beam of constant intensity.

In the conventional image forming apparatus, the amount of light on the photosensitive body may vary depending on a scanning position in the main scanning direction because of the angle of incidence of a light beam to the surface of the polygon mirror, variations in lens transmittance, and variations in mirror reflectance. If such variations in the amount of light on the photosensitive body are caused by the scanning position, variations in image density occur even if an image is formed with a constant amount of light of a light beam. As a result, a high-quality image is prevented from being produced.

In image forming apparatuses using multiple light beams and corresponding lenses to form a multicolor image, images of different colors are superposed. Therefore, production of a high-quality image may be prevented by color unevenness due to variations in the amount of light in each color. Accordingly, it is preferable to equalize the image magnifications of the colors as much as possible.

In this regard, Japanese Laid-Open Patent Application No. 6-98104 (Document 4) discloses a technique for improving image quality by correcting the shading of or variations in the amount of light in the main scanning direction.

According to this technique, the improvement of image quality is achieved by shading correction that controls an LD driver IC based on the shading of light power within a premeasured scan width so that the amount of light on the surface of a photosensitive body is constant.

FIG. 1 is a waveform chart illustrating the output signal of one of the light beam detection means of Document 1.

Such an output signal is generated by converting the output of a PD (photodiode) to a binary value based on a fixed threshold level. However, a variation in the amount of light at the time of measurement may cause a variation in the output of the PD, so that the output timing of the light beam detection signal may also change accordingly. Referring to FIG. 1, the output signal may change from [1] to [2] as the amount of light changes from [1'] (large) to [2'] (small).

This change of the output timing of the light beam detection signal causes the measured time difference to change, thus causing a problem in that magnification error is prevented from being corrected with accuracy. That is, Document 1 does not go so far as to consider making constant the condition of the amount of light at the time of measurement.

According to Document 2, with respect to the above-described problem, no equality in beam intensity is required between the light beams, and it is necessary to equalize the beam intensity of one of the light beams at the time of measuring the time difference. That is, Document 2 does not go so far as to consider making a constant condition at the time of measurement with respect to one of the light beams.

According to Document 3, light beam intensity is constant with respect to the area other than the image area. Considering the case of performing shading correction as performed in Document 4, for instance, an attempt to make constant the light beam intensity in the area other than the image area, where an image is formed, may make it difficult to return the amount of light to a desired value in the image area.

A description is given of the reason why such a problem occurs.

Consideration is given to the case where shading correction as performed in Document 4 is performed in an ideal state where the number of points at which the amount of light is corrected is equal to the total number of dots within the area subjected to the correction. In this case, if the amount of light on a photosensitive body varies in the main scanning direction as illustrated in FIG. 2A, the amount of light can be corrected to be constant in the main scanning direction as illustrated in FIG. 2C by a correction signal as illustrated in FIG. 2B.

However, providing a large number of light amount correction points as described above increases a control circuit in scale. Accordingly, in practice, the amount of light is corrected section by section (area by area). In the case of performing such correction, the varying signal as illustrated above in FIG. 2A, for instance, is corrected by a correction signal as illustrated in FIG. 3A. As a result, the amount of light varies significantly at points where the level of the correction signal switches as illustrated in FIG. 3B, thus resulting in degraded image quality.

Therefore, in general, an RC filter is inserted into the correction signal to reduce variations in the correction signal so that the correction signal approximates the state of FIG. 2B, thereby preventing a sudden change in the amount of light (reducing the difference in level of the amount of light). This difference can be made smaller by increasing the filter constant, so that image quality can be increased. However, in the case of changing the amount of light greatly, the change cannot be followed, thus causing a problem in that it takes time before the amount of light reaches an actual set value.

Therefore, it may be difficult for the technique of Document 3 to return the amount of light immediately to a desired value at a position where the area other than the image area switches to the image area. However, when consideration is given to making constant the amount of light at the time of measurement in order to perform the above-described magnification error correction with accuracy, it is only at the time of measuring the time difference that the amount of light is required to be constant.

Further, the first and second light beam detection means should not always have to be equal in beam intensity. There should be no problem even if the first and second light beam detection means are different in beam intensity. The condition of the amount of light should only have to be constant at a measurement part.

SUMMARY OF THE INVENTION

Accordingly, it is a general object of the present invention to provide a light beam scanning device, an image forming apparatus, and a light beam scanning method in which the above-described disadvantages are eliminated.

A more specific object of the present invention is to provide a light beam scanning device, an image forming apparatus, and a light beam scanning method that can correct magnification error with accuracy by causing the condition of the amount of light at a measurement part to be constant without causing unnecessary difficulties in design.

Another more specific object of the present invention is to provide a recording medium on which a program for causing a computer to execute such a light beam scanning method is recorded.

One or more of the above objects of the present invention are achieved by a light beam scanning device including: a light emission source configured to emit a light beam with which the light beam scanning device performs scanning; a deflection part configured to deflect the light beam emitted from the light emission source in a main scanning direction with a plurality of deflection surfaces thereof; first and second light beam detection parts configured to detect the light beam deflected by the deflection part at first and second positions, respectively, outside an image area on opposite sides thereof in the main scanning direction; a time difference measurement part configured to measure a time difference between the detection of the light beam by the first light beam detection part and the detection of the light beam by the second light beam detection part; and a control part configured to perform control so as to correct image magnification in the main scanning direction in the image area from the time difference measured by the time difference measurement part, wherein the control part performs control so that a condition of an amount of light of the light beam at a time of detecting the light beam by the first and second light beam detection parts is constant.

One or more of the above objects of the present invention are also achieved by an image forming apparatus including: a light beam scanning device according to the present invention; and an image carrying body configured to rotate or move in a sub scanning direction, wherein an image is formed by the light beam scanning device causing the light beam according to image data to scan a surface of the image carrying body.

One or more of the above objects of the present invention are also achieved by a light beam scanning method in a device including a light emission source configured to emit a light beam and a deflection part configured to deflect the light beam emitted from the light emission source in a main scanning direction with a plurality of deflection surfaces thereof, the light beam scanning method including the steps of: (a) detecting the light beam deflected by the deflection part at first and second positions, respectively, outside an image area on opposite sides thereof in the main scanning direction; (b) measuring a time difference between the detection of the light beam at the first position and the detection of the light beam at the second position; and (c) performing control so as to correct image magnification in the main scanning direction in the image area from the time difference measured in step (b), and performing scanning, wherein a condition of an amount of light of the light beam at a time of detecting the light beam in step (a) is constant.

One or more of the above objects of the present invention are also achieved by a computer-readable recording medium on which a program for causing a computer to execute a light beam scanning method according to the present invention is recorded.

Thus, according to one aspect of the present invention, it is possible to correct magnification error with accuracy by causing the condition of the amount of light at the time of detecting a light beam to be constant, while it is also possible to prevent unnecessary difficulties in design from being caused.

That is, the condition of the amount of light at a measurement part can be constant, while it is possible to prevent unnecessary difficulties in design from being caused without affecting control of the light beam in an image area.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

First Embodiment

Figure 4:
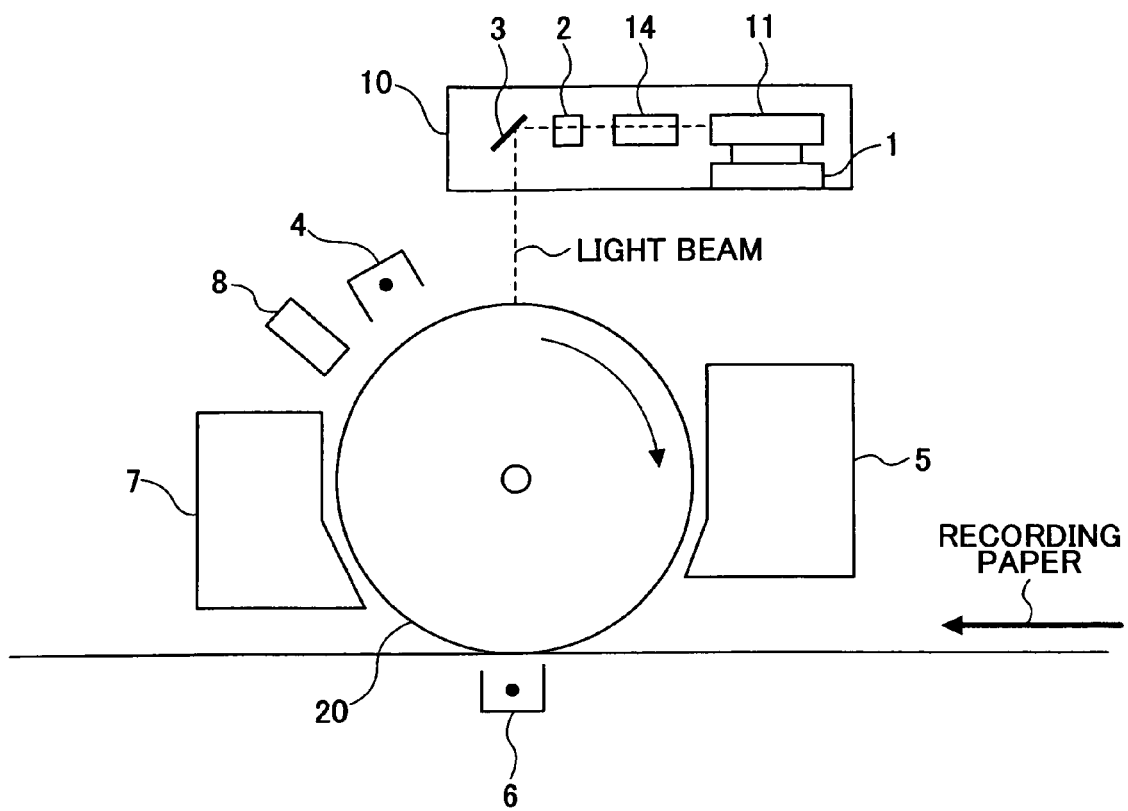
FIG. 4 is a schematic diagram illustrating a configuration of a light beam scanning device, a photosensitive body, and their periphery in an image forming apparatus according to a first embodiment of the present invention.

FIG. 4 is a schematic diagram illustrating a configuration of a light beam scanning device 10, a photosensitive body 20, and their periphery in an image forming apparatus according to a first embodiment of the present invention.

In the light beam scanning device 10, the light beam of an LD, controlled based on image data to light up, is converted into a parallel beam by a collimator lens (not graphically illustrated), and goes through a cylinder lens (not graphically illustrated) to be deflected by a polygon mirror 11 rotated by a polygon motor 1. Then, the light beam goes through an fθ lens 14 and a barrel toroidal lens (BTL) 2 to be reflected by a deflecting mirror 3 so as to scan the surface of the photosensitive body 20. The BTL 2 performs focusing in the sub scanning direction. That is, the BTL 2 has the function of condensing, and performs positional correction in the sub scanning direction, such as face tangle error correction.

A charger 4, a development unit 5, a transfer unit 6, a cleaning unit 7, and a discharger 8 are provided around the photosensitive body 20. A toner image is formed on recording paper conveyed by a paper conveyance part (not graphically illustrated) by the normal electrophotographic process of charging, exposure, development, and transfer. The toner image is fixed on the recording paper by a fusing unit (not graphically illustrated).

Figure 5:
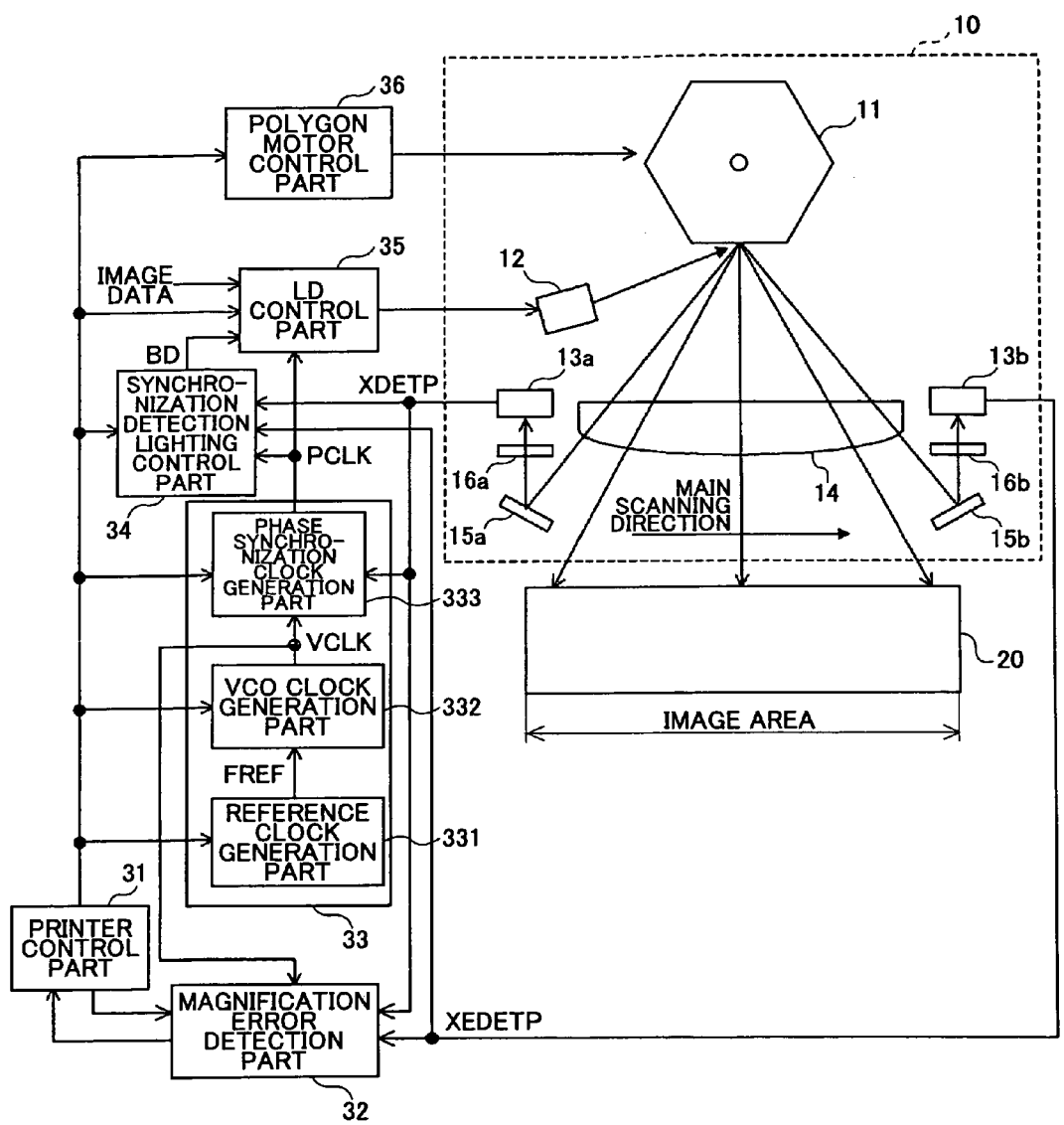
FIG. 5 is a schematic diagram illustrating a configuration for an image formation control part in the image forming apparatus according to the first embodiment of the present invention.

FIG. 5 is a schematic diagram illustrating an image formation control part and the light beam scanning device 10 in the image forming apparatus according to the first embodiment.

Synchronization detection sensors 13a and 13b that detect a light beam are provided in respective end portions (two positions outside an image area) of the light beam scanning device 10 in the main scanning direction. A light beam passing through the fθ lens 14 is reflected by mirrors 15a and 15b and condensed by lens 16a and 16b so as to enter the synchronization detection sensors 13a and 13b, respectively.

The light beam passes over the synchronization detection sensors 13a and 13b, so that a start-side synchronization detection signal XDETP is output from the synchronization detection sensor 13a and an end-side synchronization detection signal XEDETP is output from the synchronization detection sensor 13b so as to be input to a magnification error detection part 32. In the magnification error detection part 32, the time from the falling edge of the start-side synchronization detection signal XDETP to the falling edge of the end-side synchronization detection signal XEDETP is measured to be compared with a reference time difference. A pixel clock frequency is varied by the difference between the measured time and the reference time difference, thereby correcting the magnification of an image.

The image area refers to a maximum range within which an image is formable on the recording paper. The synchronization detection sensors 13a and 13b are provided outside the image area on the opposite sides thereof on a main scanning line, so that the magnification error detection part 32 can detect magnification error in the image area.

The synchronization detection signal XDETP from the synchronization detection sensor 13a is also transmitted to a pixel clock generation part 33 and a synchronization detection lighting control part 34. The pixel clock generation part 33 generates a pixel clock signal PCLK synchronized with the synchronization detection signal XDETP, and transmits the pixel clock signal PCLK to an LD control part 35 and the synchronization detection lighting control part 34. First, the synchronization detection lighting control part 34 turns ON an LD forced lighting signal BD to force the LD to light up in order to detect the synchronization detection signal XDETP. After detecting the synchronization detection signal XDETP, based on the synchronization detection signal XDETP and the pixel clock signal PCLK, the synchronization detection lighting control part 34 generates the LD forced lighting signal BD that causes the LD to light up with timing that can ensure the detection of the synchronization detection signal XDETP without generation of flare light. Then, the synchronization detection lighting control part 34 transmits the LD forced lighting signal BD to the LD control part 35.

The LD control part 35 controls the lighting of the LD by an LD unit 12 in accordance with the LD forced lighting signal BD and an image signal synchronized with the pixel clock signal PCLK. As a result, a laser beam (light beam) is emitted from the LD unit 12 and deflected by the polygon mirror 11 so as to pass through the fθ lens 14 and scan the surface of the photosensitive body 20.

A polygon motor control part 36 controls the rotation of the polygon motor 1 to a specified speed (for instance, rpm) based on a control signal provided from a printer control part 31.

Figure 6:
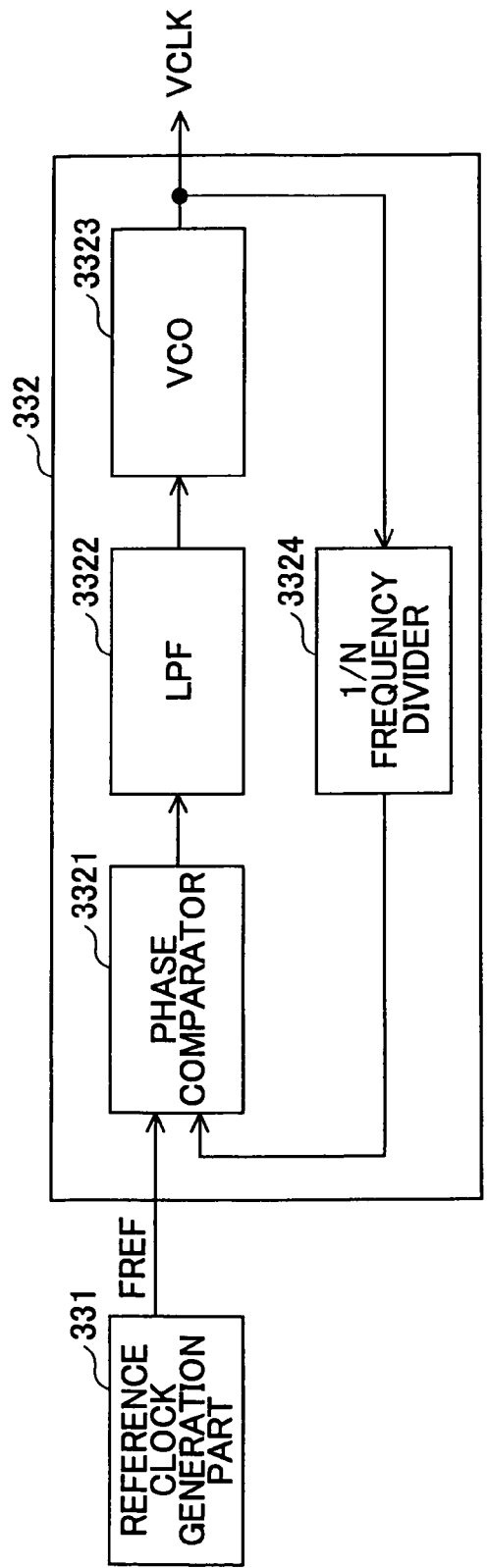
FIG. 6 is a block diagram illustrating a configuration of a VCO clock generation part and its periphery according to the first embodiment of the present invention.

The pixel clock generation part 33 includes a reference clock generation part 331, a VCO (voltage-controlled oscillator) clock generation part 332, and a phase synchronization clock generation part 333. FIG. 6 is a block diagram illustrating the VCO clock generation part 332, which is a phase-lock loop (PLL). A reference clock signal FREF from the reference clock generation part 331 and a signal obtained by dividing the output signal VCLK of the VCO clock generation part 332 by N in a divide-by-N frequency divider 3324 are input to a phase comparator 3321. The phase comparator 3321 compares the phases of the falling edges of the input signals, and outputs an error component to an LPF (low-pass filter) 3322 as a constant current. Unnecessary high-frequency components and noise are removed by the LPF 3322. The output of the LPF 3322 is provided to a VCO 3323. The VCO 3323 outputs an oscillation frequency that depends on the output of the LPF 3322. Accordingly, the frequency of VCLK can be varied by varying the frequency of FREF and the frequency division ratio N.

Figure 7:
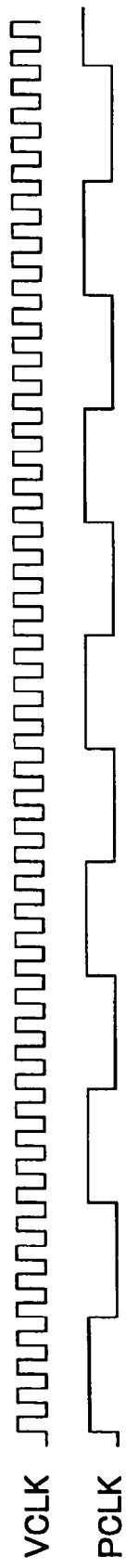
FIG. 7 is a waveform chart illustrating a signal generated by a phase synchronization clock generation part according to the first embodiment of the present invention.

As shown in FIG. 7, the phase synchronization clock generation part 333 generates the pixel clock signal PCLK from VCLK, whose frequency is set to be eight times the frequency of the pixel clock signal PCLK, the pixel clock signal PCLK being synchronized with the synchronization detection signal XDETP.

Figure 8:
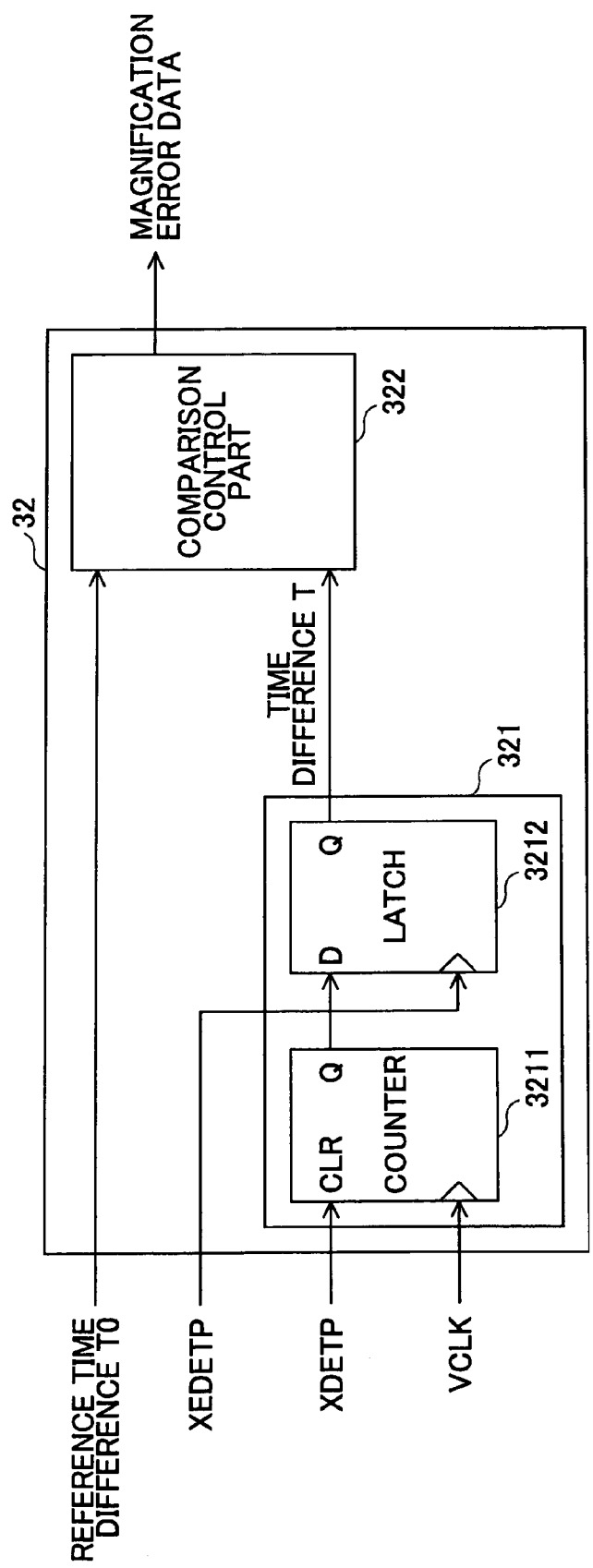
FIG. 8 is a block diagram illustrating a magnification error detection part according to the first embodiment of the present invention.

FIG. 8 is a block diagram illustrating the magnification error detection part 32.

The magnification error detection part 32 includes a time difference counting part 321 and a comparison control part 322. The time difference counting part 321 includes a counter 3211 and a latch 3212. The counter 3211 is cleared by the start-side synchronization detection signal XDETP, and is incremented by the clock signal VCLK. The latch 3212 latches a count value at the falling edge of the end-side synchronization detection signal XEDETP. The count value (time difference T) and a preset reference time difference T0 are compared in the comparison control part 322 so that data on the difference between T and T0 (magnification error data) is obtained and provided to the printer control part 31. The printer control part 31 calculates a necessary set value of the pixel clock frequency from the magnification error data, and transmits the calculated set value to the pixel clock generation part 33 as correction data. The pixel clock generation part 33 generates the pixel clock signal PCLK in accordance with the correction data, and corrects image magnification. Thus, the printer control part 31 controls the light emission of the LD, so that image magnification is corrected.

Figure 2A:
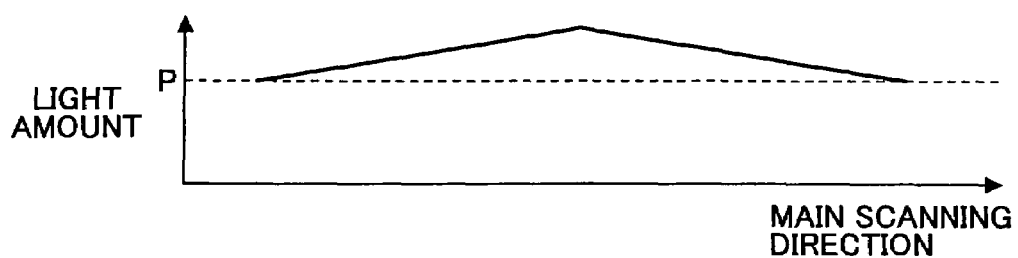
FIGS. 2A through 2C are graphs for illustrating light amount distribution in a case where ideal shading correction is performed.
Figure 2B:
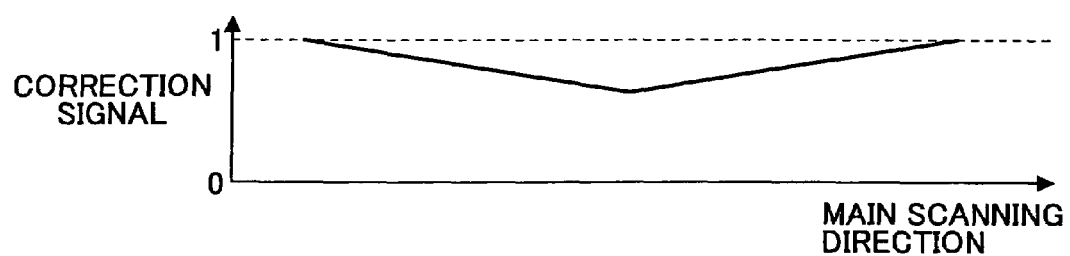
Figure 2C:
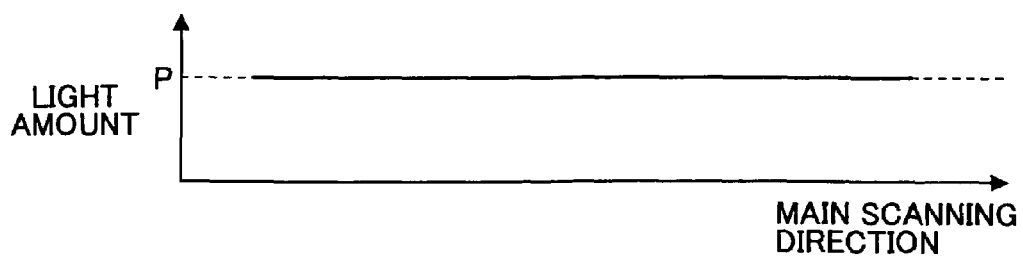
Figure 3A:
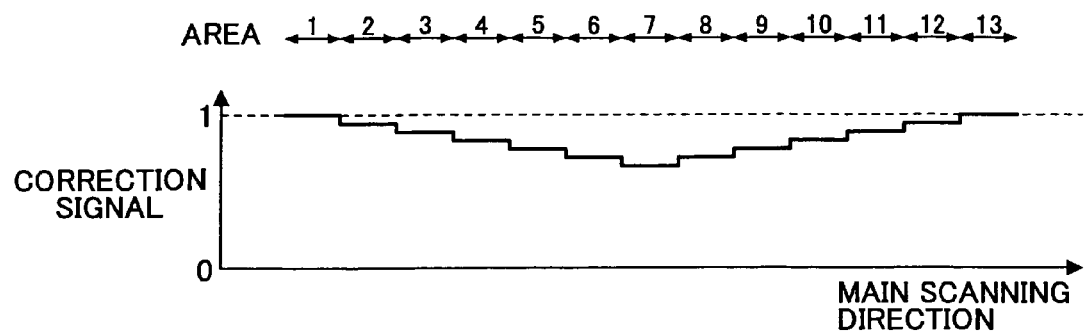
FIGS. 3A and 3B are graphs for illustrating light amount distribution in a case where shading correction is performed with coarse dots on a signal shown in FIG. 2A.
Figure 3B:
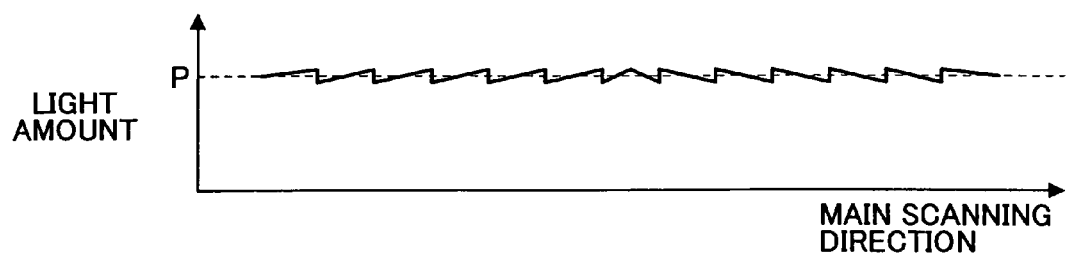

At the time of image formation, the printer control part 31 performs shading correction on the image data of an image to be formed in the image area. By inserting an RC filter into a correction signal by the shading correction, the amount of light is prevented from including a difference in level due to the shading correction as described above with reference to FIGS. 2A through 2C.

A description of the shading correction, which is a well known technique as described above with reference to FIGS. 2A through 2C, 3A and 3B, is omitted.

Figure 9:
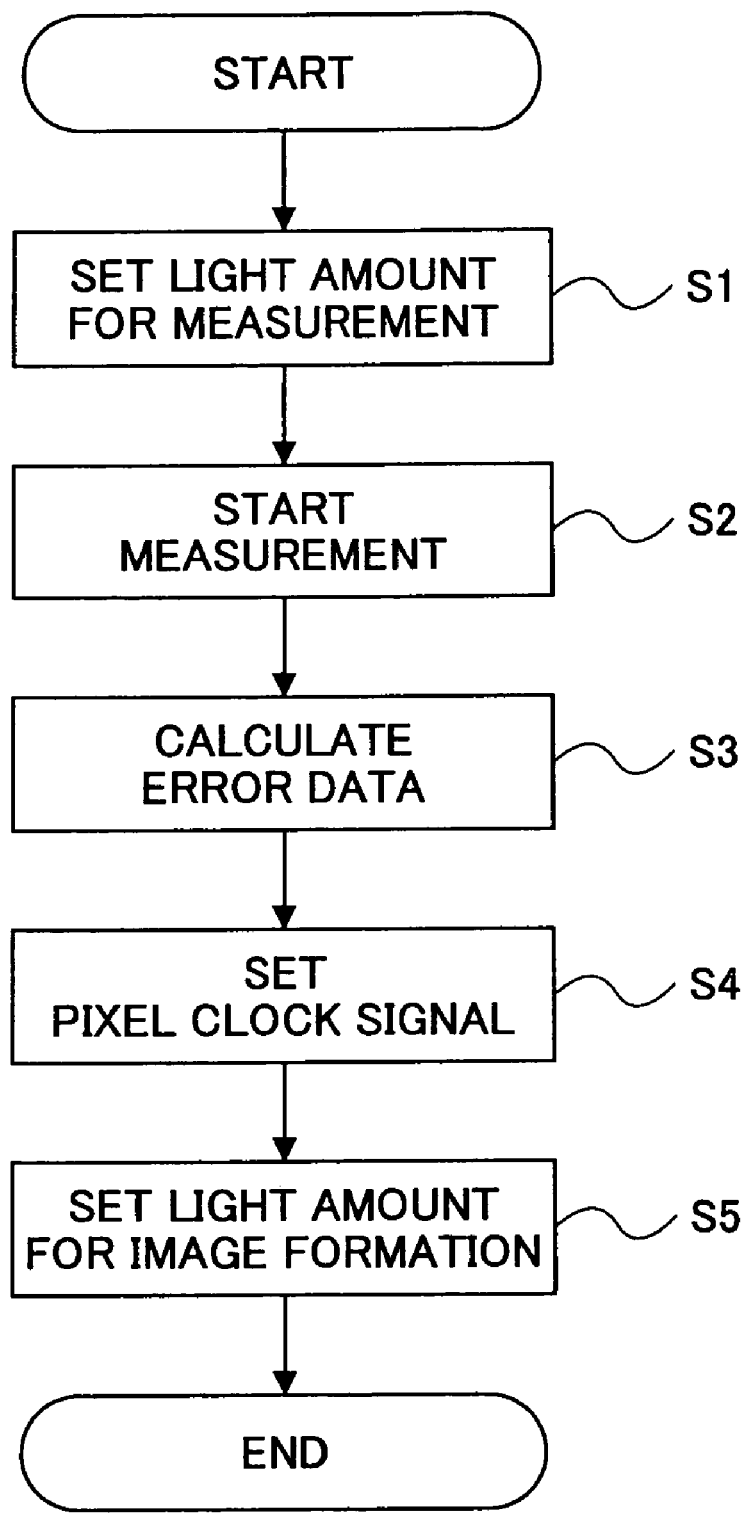
FIG. 9 is a flowchart illustrating a control flow at the time of performing point-to-point measurement according to the first embodiment of the present invention.

FIG. 9 is a flowchart illustrating a control flow at the time of performing point-to-point measurement (measurement of a time difference between the two points or positions at which the synchronization detection sensors 13a and 13b are provided).

Before printing is started, or when the point-to-point measurement as a magnification correction operation is started between pages, first, in step S1 of FIG. 9, the printer control part 31 sets the amount of light for the point-to-point measurement. This amount of light, which is a preset value, is set to the LD control part 35 by the printer control part 31. After a predetermined amount of light is set, in step S2, the measurement is started.

In step S3, the magnification error detection part 32 compares the measured time difference and the reference time difference T0, calculates the magnification error data, and transmits the magnification error data to the printer control part 31. In step S4, the printer control part 31 calculates a set value of the pixel clock frequency based on the transmitted magnification error data, and transmits the calculated set value to the pixel clock generation part 33 as correction data. In step S5, the amount of light of the LD is returned to a setting for image formation.

The amount of light of the LD may be returned to the setting for image formation at any time as long as the measurement is completed. This returning is performed with such timing that the next image forming operation is prevented from being affected. Thus, in performing the point-to-point measurement, the amount of light of a light beam entering each of the synchronization detection sensors 13a and 13b becomes a predetermined amount of light set as described above at least when the light beam is detected.

Thus, according to the image forming apparatus of this embodiment, the amount of light of a light beam entering the synchronization detection sensor 13a and that of the light beam entering the synchronization detection sensor 13b at the time of measuring a time difference between the two points or positions where the synchronization detection sensors 13a and 13b are provided are set to the same predetermined value at least when the light beam is detected. As a result, the time difference can be measured with accuracy, so that magnification error can be corrected with accuracy.

Second Embodiment

Next, a description is given of an image forming apparatus according to a second embodiment of the present invention. The image forming apparatus of this embodiment is equal to that of the first embodiment in the general configuration of each of the parts of the image forming apparatus, such as the light beam scanning device 10 and the image formation control part, and has the same control flow as that of FIG. 9 of the first embodiment. In the image forming apparatus of the second embodiment, the point-to-point measurement is performed with a maximum amount of light.

Figure 1:
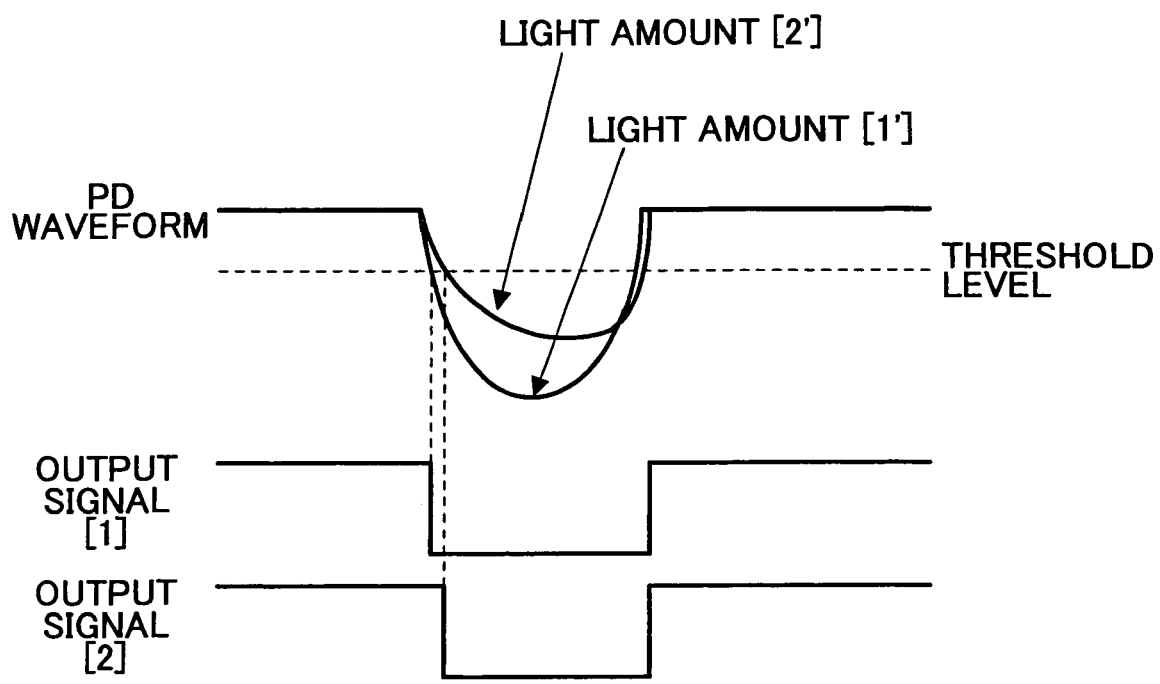
FIG. 1 is a waveform chart illustrating the output signal of conventional light beam detection means.

FIG. 1 illustrates a change in the timing of the output signal (XDETP/XEDETP) due to a change in the amount of light. According to the second embodiment, the amount of light at the time of performing the point-to-point measurement is set to a maximum value (a maximum amount of light possible as a system). As a result, a change in timing with respect to a change in the amount of light can be further controlled, so that it is possible to increase a margin with respect to a threshold level.

Thus, according to the image forming apparatus of the second embodiment, it is possible to ensure that a time difference can be measured with more accuracy in the point-to-point measurement, so that magnification error can be corrected with accuracy.

Third Embodiment

Next, a description is given of an image forming apparatus according to a third embodiment of the present invention. The image forming apparatus of this embodiment is equal to that of the first embodiment in the general configuration of each of the parts of the image forming apparatus, such as the light beam scanning device 10 and the image formation control part, and has the same control flow as that of FIG. 9 of the first embodiment. In the image forming apparatus of the third embodiment, the amount of light at the time of performing the point-to-point measurement is set to the medium value of a light amount variation range within which the amount of light is variable.

Figure 10:
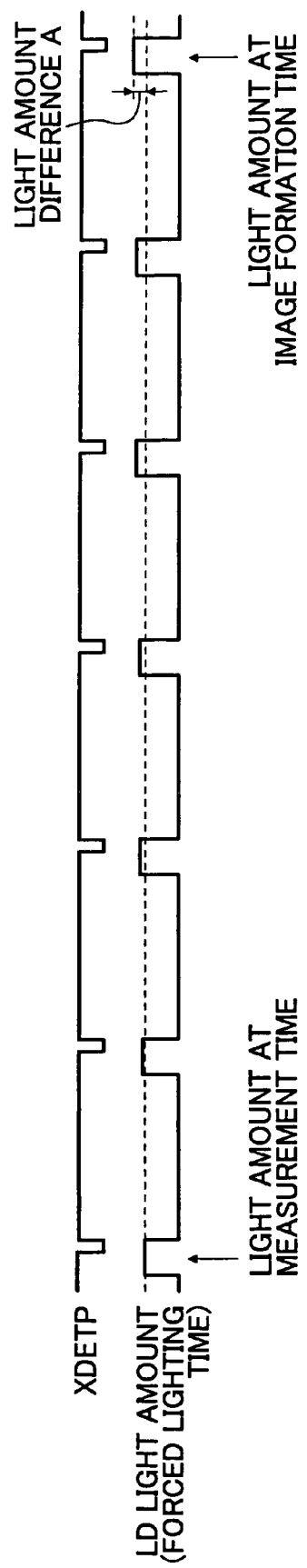
FIG. 10 is a waveform chart illustrating the transition of the amount of light from a time at which the setting of the amount of light is returned to that for image formation after completion of the point-to-point measurement to a time at which the amount of light reaches the set value according to a third embodiment of the present invention.

FIG. 10 illustrates the transition of the amount of light from a time at which the setting of the amount of light is returned to that for image formation after completion of the point-to-point measurement to a time at which the amount of light reaches the set value. In the case of a system that performs an APC (automatic power control) operation once a line, an APC sampling operation is performed during a period for generating the synchronization detection signal XDETP in which period the LD is forced to light up. However, the time is extremely short with respect to one line cycle. Accordingly, it takes time before the amount of light actually reaches a set value (amount of light) after the setting of the amount of light is changed. Therefore, as a light amount difference A (the difference in the amount of light between the time of measurement and the time of image formation) increases, more time is required and a greater effect is exerted on the image forming operation.

The amount of light at the time of image formation may be subject to change because of process control. However, by setting the amount of light at the time of the point-to-point measurement to the medium value of the light amount variation range, the worst value (maximum value) of the light amount difference A can be reduced to half of the variation width.

Thus, according to the image forming apparatus of the third embodiment, magnification error can be corrected with accuracy while an effect on the image forming operation is further reduced.

Fourth Embodiment

Next, a description is given of an image forming apparatus according to a fourth embodiment of the present invention. The image forming apparatus of this embodiment is equal to that of the first embodiment in the general configuration of each of the parts of the image forming apparatus, such as the light beam scanning device 10 and the image formation control part. In the image forming apparatus of the fourth embodiment, the amount of light at the time of performing the point-to-point measurement is set to different predetermined values with respect to the synchronization detection sensors 13a and 13b.

Figure 11:
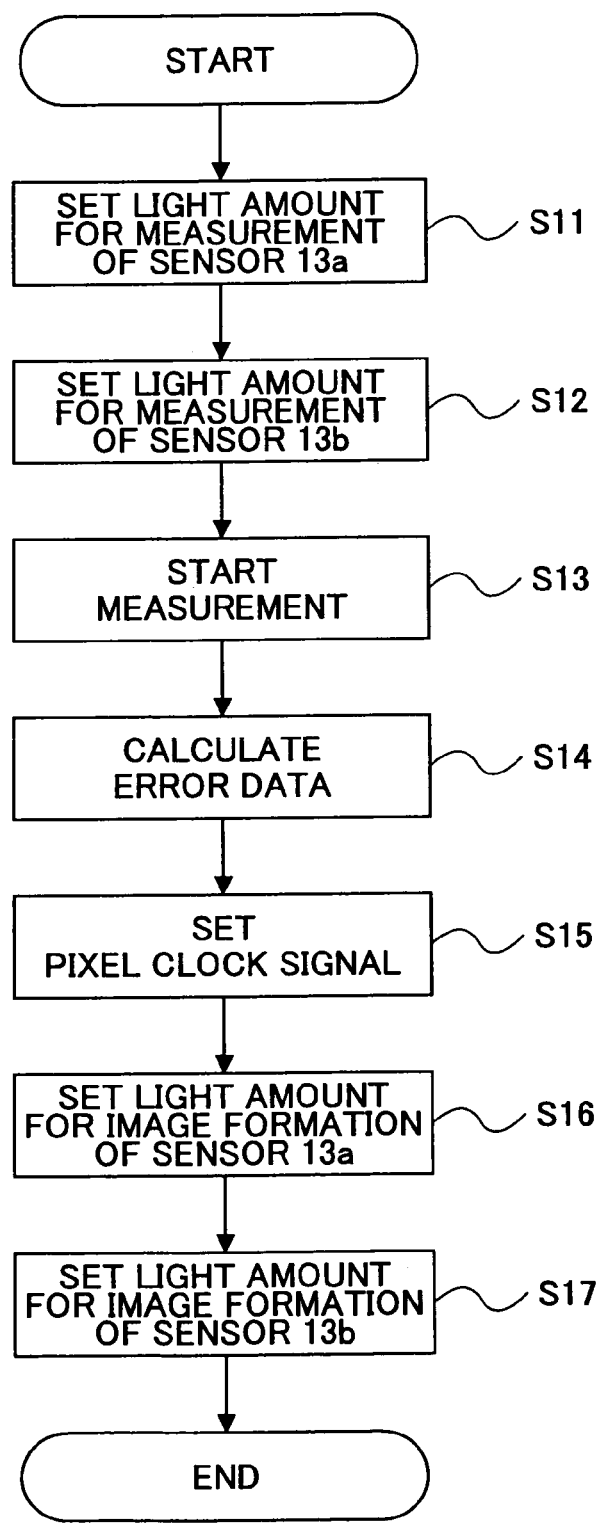
FIG. 11 is a flowchart illustrating a control flow at the time of performing the point-to-point measurement according to a fourth embodiment of the present invention.

FIG. 11 is a flowchart illustrating a control flow at the time of performing the point-to-point measurement according to this embodiment. The control flow of the fourth embodiment is different from those of the first through third embodiments in that the amount of light at a position where a light beam enters the synchronization detection sensor 13a and the amount of light at a position where the light beam enters the synchronization detection sensor 13b are set separately.

For instance, in the case of equalizing the amount of light of a light beam entering the synchronization detection sensor 13a with that of the light beam entering the synchronization detection sensor 13b under the condition that the light utilization efficiency of the light beam entering the synchronization detection sensor 13a is different from that of the light beam entering the synchronization detection sensor 13b as the characteristic of the light beam scanning device 10, it is necessary that the amount of light of a light beam actually emitted from the LD unit 12 be set differently with respect to the synchronization detection sensors 13a and 13b.

Referring to FIG. 11, in step S11, the amount of light for measurement is set with respect to the synchronization detection sensor 13a. In step S12, the amount of light for measurement is set with respect to the synchronization detection sensor 13b. Then, in steps S13 through S15, the same operations as performed in steps S2 through S4 of FIG. 9 are performed. In step S16, the amount of light for image formation is set with respect to the synchronization detection sensor 13a. In step S17, the amount of light for image formation is set with respect to the synchronization detection sensor 13b.

Thus, according to the image forming apparatus of the fourth embodiment, it is possible to correct magnification error with accuracy in accordance with the characteristic of the light beam scanning device 10.

Fifth Embodiment

Next, a description is given of an image forming apparatus according to a fifth embodiment of the present invention. The image forming apparatus of this embodiment is equal to those of the first through fourth embodiments in the general configuration of the light beam scanning device 10 and the image formation control part. In the image forming apparatus of the fifth embodiment, a color image is formed using a photosensitive body drum and an intermediate transfer belt.

Figure 12:
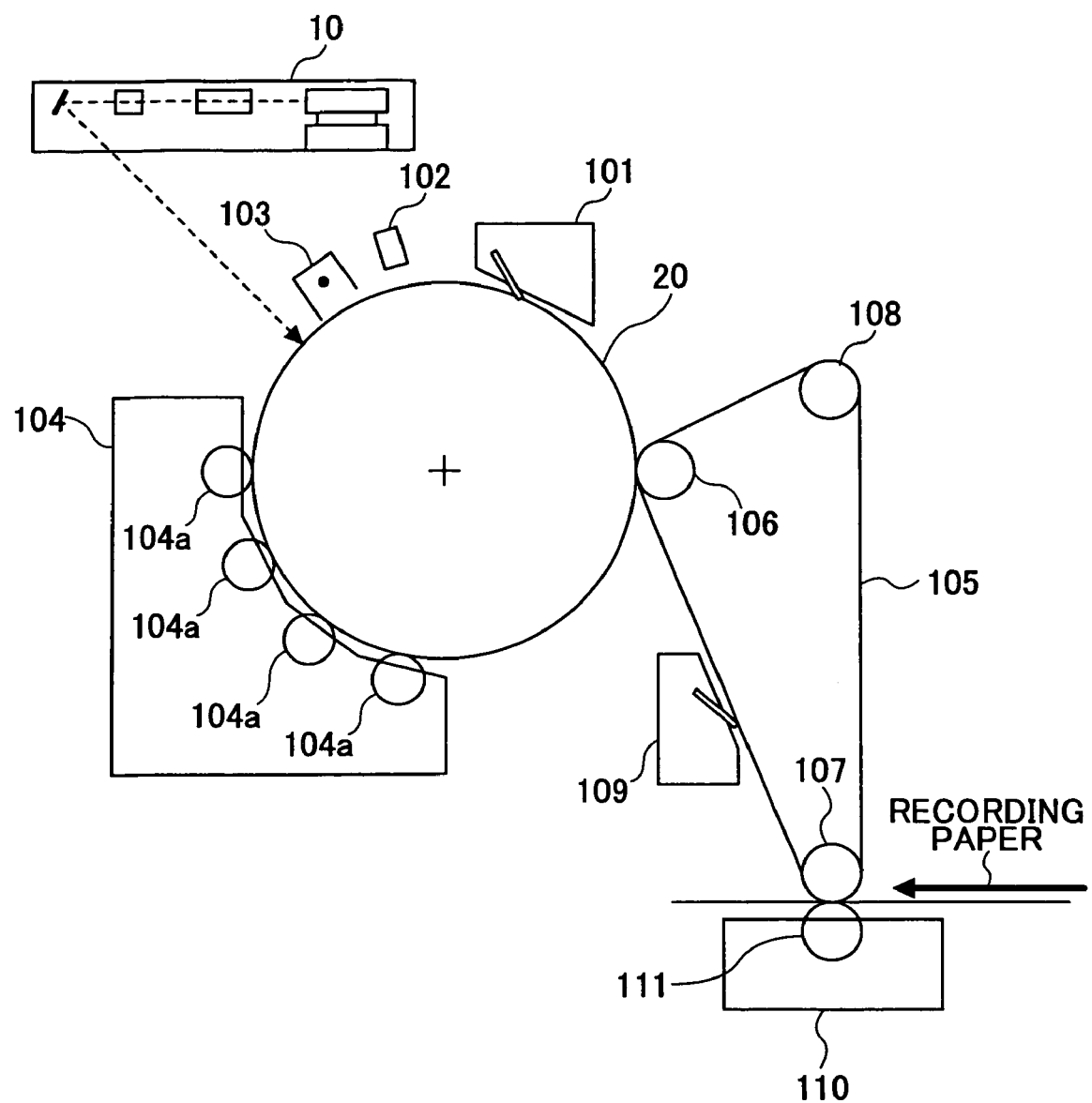
FIG. 12 is a schematic diagram illustrating a configuration of the photosensitive body, an intermediate transfer belt, and their periphery in a color image forming apparatus according to a fifth embodiment of the present invention.

FIG. 12 is a schematic diagram illustrating the color image forming apparatus according to the fifth embodiment. The same elements as those of the image forming apparatus of the first embodiment are referred to by the same numerals.

The image forming apparatus of this embodiment has the same light beam scanning device 10 and image formation control part as those of the first through fourth embodiments. Writing is performed with light in accordance with image data so that an electrostatic latent image is formed on the drum of the photosensitive body 20 as a latent image carrying body. The drum of the photosensitive body 20 rotates counterclockwise. A photosensitive body cleaning unit 101, a discharger 102, a charger 103, a development unit 104, and an intermediate transfer belt 105 as a carrier body are provided around the drum of the photosensitive body 20. The development unit 104 includes a black (BK) development unit, a cyan (C) development unit, a magenta (M)

development unit, and a yellow (Y) development unit, which are not graphically illustrated. The development unit 104 further includes development sleeves 104a and development paddles (not graphically illustrated) corresponding to the four colors. Each development sleeve 104a rotates so that a developer of the corresponding color opposes the photosensitive body 20 in order to develop the electrostatic latent image. Each development paddle pumps up a developer of the corresponding color, and rotates to mix the developer.

A description is given of an image forming operation according to this embodiment. A black development operation, a cyan development operation, a magenta development operation, and a yellow development operation are performed in the order described in this case, but may be performed in a different order.

When a print operation is started, first, writing with light by the light beam scanning device 10 and formation of a latent image are started based on black image data. The rotation of the corresponding development sleeve 104a is started before the leading edge part of the black latent image reaches the development position of the BK development unit so that the black latent image can be developed from its leading edge part. Thereby, the black latent image is developed with a black toner. Thereafter, the development of the area of the black latent image is continued until the trailing edge part of the black latent image passes the development position of the BK development unit, when the development of the area of the black latent image is stopped. This is completed at least before the arrival of the leading edge part of a cyan latent image by cyan image data.

A black toner image formed on the photosensitive body 20 is transferred to the surface of the intermediate transfer belt 105, which is driven at the same speed as the photosensitive body 20. This belt transfer is performed by applying a predetermined bias voltage to a belt transfer bias roller 106 with the photosensitive body 20 and the intermediate transfer belt 105 being in contact with each other. The black toner image, a cyan toner image, a magenta toner image, and a yellow toner image that are formed sequentially on the photosensitive body 20 are positioned and formed sequentially in the same plane on the intermediate transfer belt 105 so that the toner images of the four colors are superposed to form a belt transferred image. Thereafter, the belt transferred image is transferred at a time to recording paper conveyed by a paper conveyance part (not graphically illustrated).

On the part of the photosensitive body 20, a cyan process is entered after the black process, and is followed by a magenta process and a yellow process. The cyan, magenta, and yellow processes are equal to the black process except for toner colors, and a description thereof is omitted.

The intermediate transfer belt 105 is engaged by a driving roller 107, the belt transfer bias roller 106, and a driven roller 108, and is driven and controlled by a drive motor (not graphically illustrated).

A belt cleaning unit 109 includes a blade and a contact and separation mechanism. While the black, cyan, magenta, and yellow images are being transferred to the belt 105, the contact and separation mechanism prevents the blade from coming into contact with the belt 105.

A paper transfer unit includes a paper transfer bias roller 111 and a contact and separation mechanism (not graphically illustrated). Normally, the paper transfer bias roller is separated from the surface of the intermediate transfer belt 105. When the four-color superposed image formed on the surface of the intermediate transfer belt 105 is transferred at a time to the recording medium, the paper transfer bias roller 111 is pressed by the contact and separation mechanism to apply a predetermined bias voltage, so that the image is transferred to the recording medium conveyed by the paper conveyance part (not graphically illustrated).

The recording paper is fed in timing with the arrival of the leading edge part of the four-color superposed image formed on the surface of the intermediate transfer belt 105 at a paper transfer position.

The image transferred to the recording paper is fixed by a fusing unit (not graphically illustrated).

The point-to-point measurement described above in the first through fourth embodiments is also applicable in this embodiment.

Thus, according to the image forming apparatus of the fifth embodiment, by performing the point-to-point measurement described above in the first through fourth embodiments, a time difference can be measured with accuracy so that magnification error can be corrected with accuracy also with respect to the configuration of forming a color image using a photosensitive body drum and an intermediate transfer belt.

Sixth Embodiment

Next, a description is given of an image forming apparatus according to a sixth embodiment of the present invention. The image forming apparatus of this embodiment is equal to those of the first through fourth embodiments in the general configuration of the image formation control part. In the image forming apparatus of the sixth embodiment, a color image is formed using four photosensitive body drums and four polygon mirrors.

Figure 13:
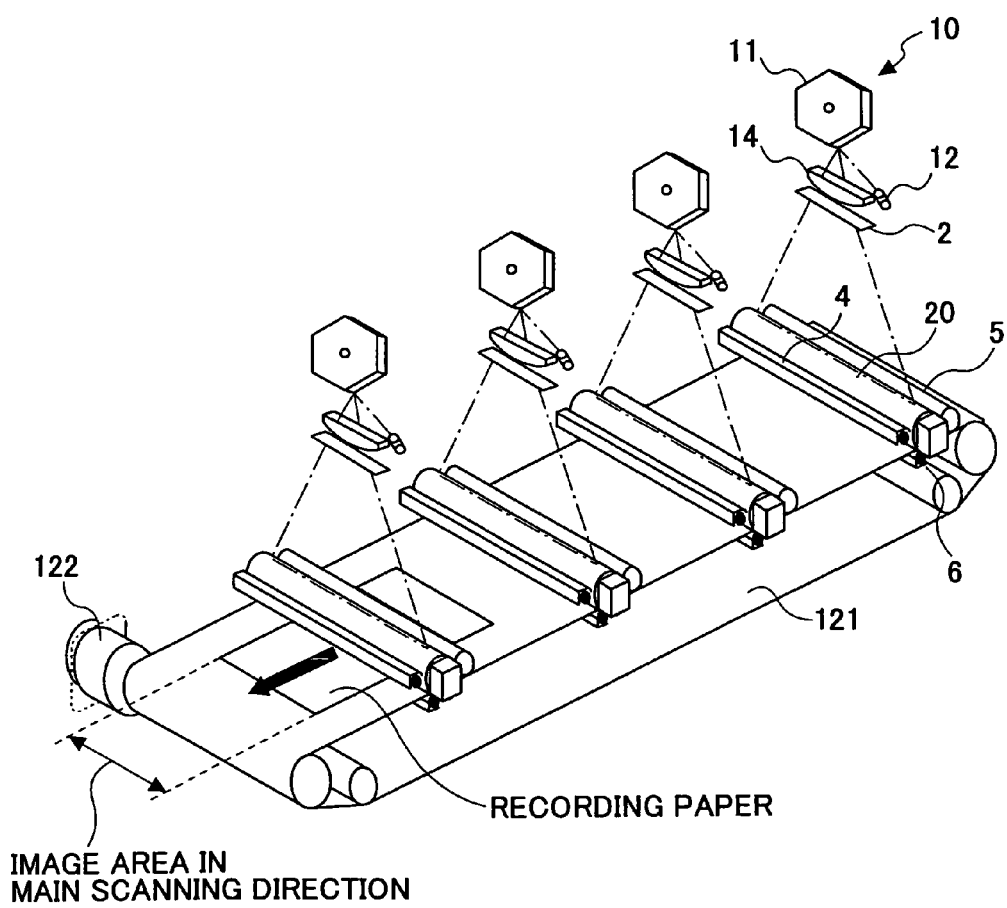
FIG. 13 is a perspective view of part of a four-drum-type color image forming apparatus according to a sixth embodiment of the present invention.

FIG. 13 is a diagram illustrating the four-drum-type color image forming apparatus according to the sixth embodiment. The same elements as those of the first embodiment are referred to by the same numerals.

The image forming apparatus of FIG. 13 includes four image formation parts (each including the photosensitive body 20, the development unit 5, the charger 4, and the transfer unit 6) and four light beam scanning devices 10 in order to form a color image by superposing images of four colors of yellow, magenta, cyan, and black. An image of the first color is formed on recording paper conveyed in a direction indicated by arrow in FIG. 13 by a transfer belt 121 driven by a conveyance motor 122, and images of the second, third, and fourth colors are transferred sequentially onto the recording paper, so that the images of the four colors are superposed to form a color image on the recording paper. The color image on the recording paper is fixed by a fusing unit (not graphically illustrated). In each image formation part, the charger 4, the development unit 5, the transfer unit 6, a cleaning unit (not graphically illustrated), and the discharger 8 are provided around the photosensitive body 20. An image is formed on the recording paper by the normal electrophotographic process of charging, exposure, development, and transfer.

The point-to-point measurement described above in the first through fourth embodiments is also applicable in the sixth embodiment.

In this case, the light beam scanning device 10 is provided independently for each color. Therefore, each light beam scanning device 10 performs correction of magnification. The devices 10 may employ respective light amount set values.

Thus, according to the image forming apparatus of the sixth embodiment, by performing the point-to-point measurement described above in the first through fourth embodiments, a time difference can be measured with accuracy so that magnification error can be corrected with accuracy also with respect to the configuration of forming a color image using four photosensitive body drums and four polygon mirrors.

Seventh Embodiment

Next, a description is given of an image forming apparatus according to a seventh embodiment of the present invention. In the image forming apparatus of the seventh embodiment, a color image is formed using four photosensitive body drums and one polygon mirror.

Figure 14:
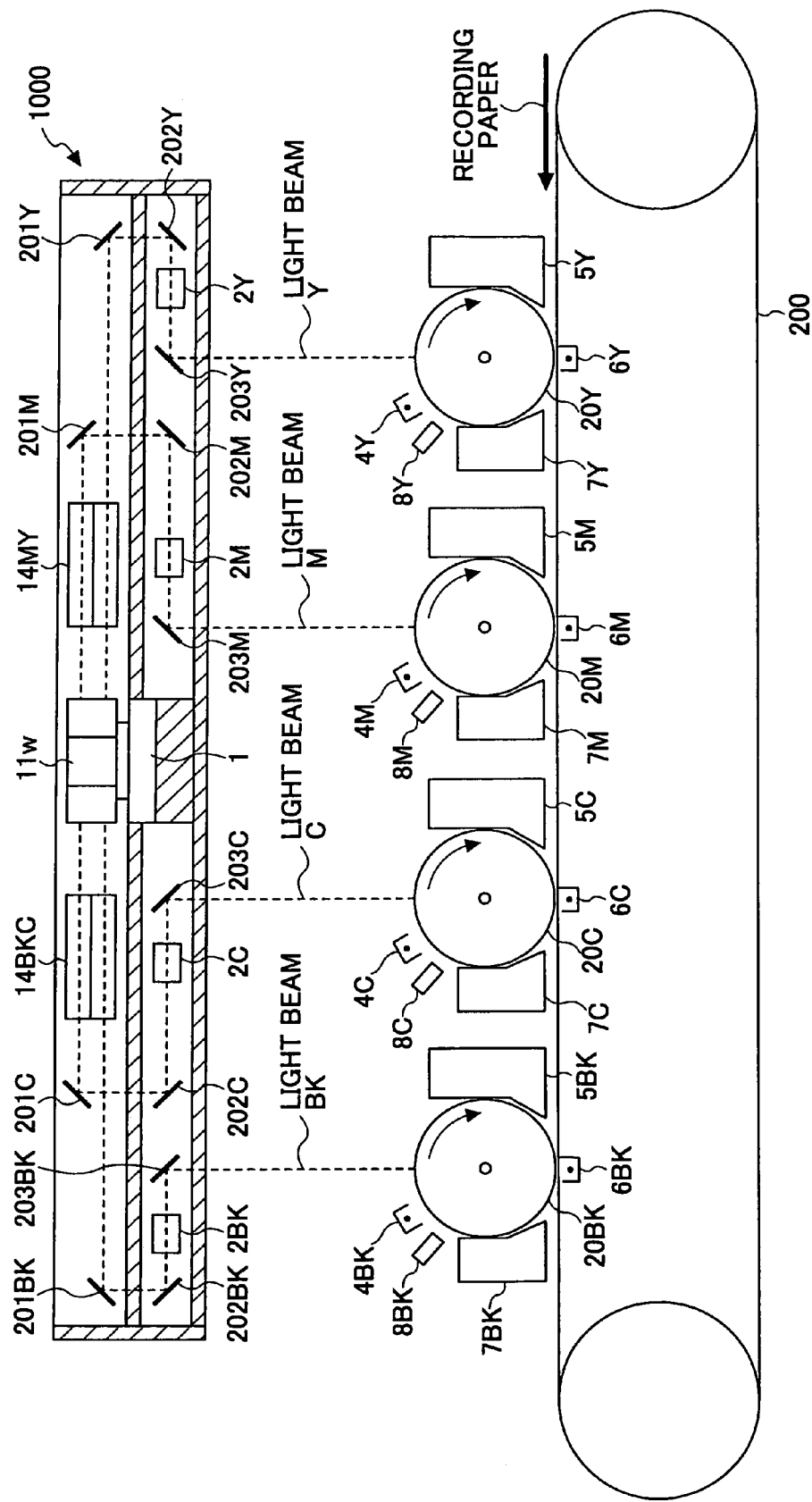
FIG. 14 is a sectional view of part of a four-drum-type color image forming apparatus according to a seventh embodiment of the present invention.

FIG. 14 is a schematic diagram illustrating the four-drum-type image forming apparatus according to the seventh embodiment. The same elements as those of the first embodiment are referred to by the same numerals.

The image forming apparatus of FIG. 14 includes four image formation parts and one light beam scanning device (an optical unit) 1000 in order to form a color image by superposing images of four colors of yellow, magenta, cyan, and black. With respect to each color, the charger 4, the development unit 5, the transfer unit 6, the cleaning unit 7, and the discharger 8 are provided around the photosensitive body 20. An image is formed on recording paper by the normal electrophotographic process of charging, exposure, development, and transfer. An image of the first color is formed on recording paper conveyed by a transfer belt 200 in a direction indicated by the straight arrow in FIG. 14, and images of the second, third, and fourth colors are transferred sequentially onto the recording paper, so that the images of the four colors are superposed to form a color image on the recording paper. The color image on the recording paper is fixed by a fusing unit (not graphically illustrated). In the following, for convenience of description, a suffix indicating a color, such as BK, C, M, or Y, may be attached to the reference numeral of a component of the image forming apparatus so as to indicate that the component is used to form an image of the color.

Figure 15:
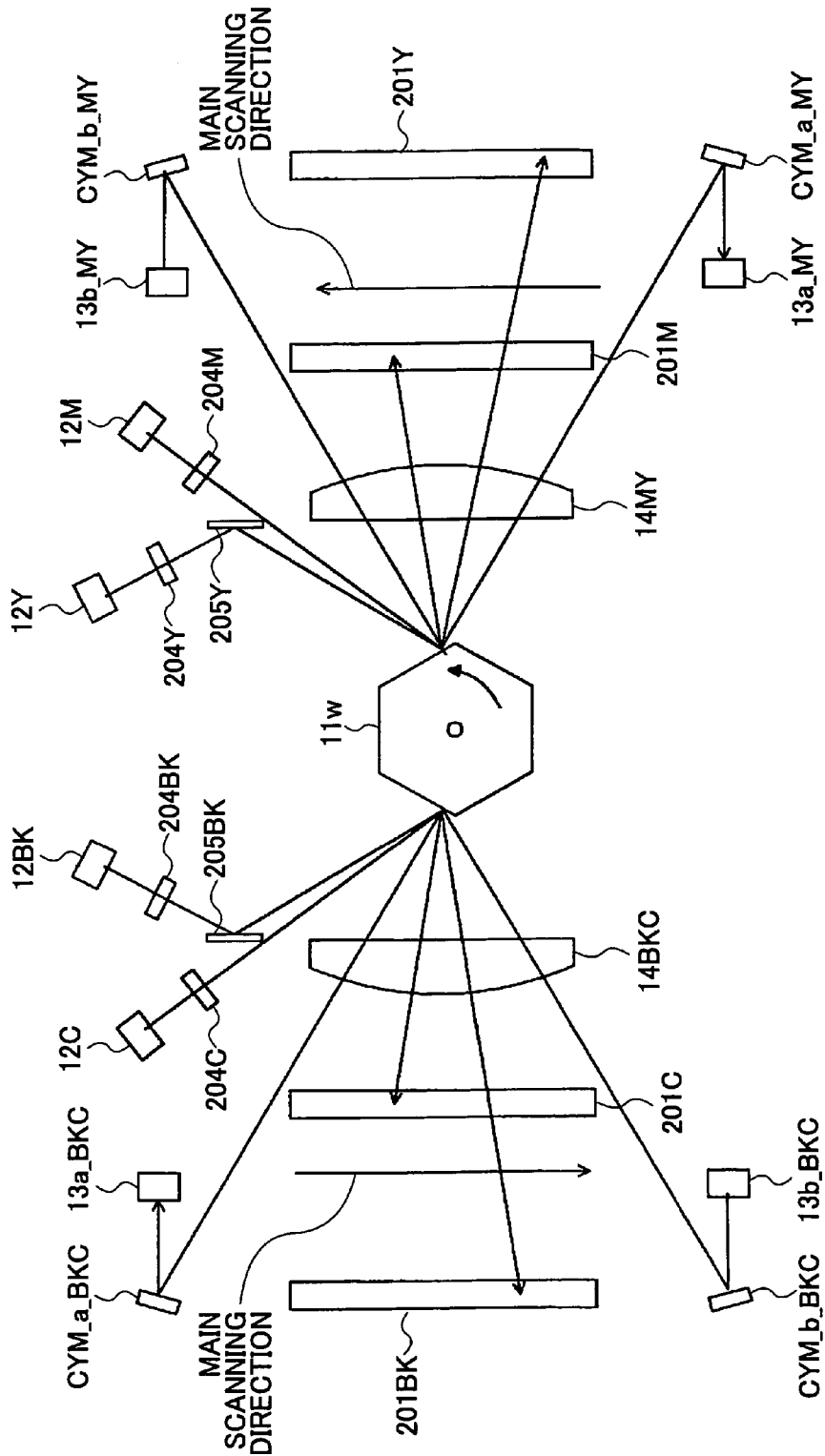
FIG. 15 is a top plan view of a light beam scanning device according to the seventh embodiment of the present invention.

The light beam scanning device (optical unit) 1000 of this embodiment employs a polygon mirror 11w. Light beams of different colors are deflected by the upper part and the lower part, respectively, of the polygon mirror 11w so as to perform scanning. Further, as shown in FIG. 15, opposed symmetrical scanning is performed with respect to the polygon mirror 11w so that the light beams for the four colors scan the surfaces of the corresponding photosensitive bodies 20. The light beam for each color is deflected by the polygon mirror 11w to pass through the corresponding fθ lens 14. Then, the light beam is deflected by corresponding first and second mirrors 201 and 202 to pass through the corresponding BLT 2, and is further deflected by a corresponding third mirror 203 to scan the surface of the corresponding photosensitive body 20.

FIG. 15 is a top plan view of the light beam scanning device (optical unit) 1000 according to this embodiment.

A light beam from the LD unit 12Y and a light beam from the LD unit 12BK pass through cylinder lenses (CYLs) 204Y and 204BK, respectively, to be made incident on the lower part of the polygon mirror 11w by reflecting mirrors 205Y and 205BK, respectively. The polygon mirror 11w rotates to deflect the light beams so that the light beams pass through the fθ lenses 14MY and 14BKC, respectively, to be deflected by the first mirrors 201Y and 201BK. A light beam from the LD unit 12M and a light beam from the LD unit 12C pass through cylinder lenses (CYLs) 204M and 204C, respectively, to be made incident on the upper part of the polygon mirror 11w. The polygon mirror 11w rotates to deflect the light beams so that the light beams pass through the fθ lenses 14MY and 14BKC, respectively, to be deflected by the first mirrors 201M and 201C.

According to this embodiment, on both writing end parts in the main scanning direction, cylinder mirrors CYM_a_BKC, CYM_a_MY, CYM_b_BKC, and CYM_b_MY and the synchronization detection sensors 13a_BKC, 13a_MY, 13b_BKC, and 13b_MY are provided. The light beams passing through the fO lenses 14 are reflected and condensed by the corresponding cylinder mirrors CYM_a_BKC, CYM_a_MY, CYM_b_BKC, and CYM_b_MY to enter the corresponding synchronization detection sensors 13a_BKC, 13a_MY, 13b_BKC, and 13b_MY.

The synchronization detection sensors 13a_BKC and 13a_MY serve to detect the corresponding start-side synchronization detection signals XDETP. The synchronization detection sensors 13b_BKC and 13b_MY serve to detect the corresponding end-side synchronization detection signals XEDETP. The light beams from the LD units 12C and 12BK use the cylinder mirrors CYM_a_BKC and CYM_b_BKC and the synchronization detection sensors 13a_BKC and 13b BKC in common. The light beams from the LD units 12Y and 12M use the cylinder mirrors CYM_a_MY and CYM_b_MY and the synchronization detection sensors 13a_MY and 13b_MY in common. Since two different light beams enter the same synchronization detection sensor, the timing of entrance is set to differ between the two light beams. However, the synchronization detection sensors 13a and 13b may be provided for each color light beam.

As shown in FIG. 15, the light beams C and BK and the light beams Y and M scan in the opposite directions.

In the configuration where two different light beams enter the same synchronization detection sensor, the image formation control part should be provided with a separation circuit that separates the start-side synchronization detection signal XDETP into synchronization detection signals of respective colors. In this case, the synchronization detection signals separated by the separation circuit are transmitted to the corresponding phase synchronization clock generation parts 333, synchronization detection lighting control parts 34, and magnification error detection parts 32 of the respective colors in the image formation control part shown in FIG. 5. In the case of providing the synchronization detection sensors 13a and 13b for each color light beam, the same configuration as shown above in FIG. 5 is provided with respect to each color.

The point-to-point measurement as described above in the first through fourth embodiments is also applicable to the seventh embodiment.

In this case, since an independent control part is provided for each color, magnification correction is performed independently with respect to each color. Each color may have an independent light amount set value employed therefor.

Thus, according to the image forming apparatus of the seventh embodiment, by performing the point-to-point measurement described above in the first through fourth embodiments, a time difference can be measured with accuracy so that magnification error can be corrected with accuracy also with respect to the configuration of forming a color image using four photosensitive body drums and one polygon mirror.

Eighth Embodiment

Next, a description is given of an image forming apparatus according to an eighth embodiment of the present invention. The image forming apparatus of this embodiment is equal to those of the first through fourth embodiments in the general configuration of the light beam scanning device 10 and the image formation control part. In the image forming apparatus of the eighth embodiment, a detachable process cartridge is employed.

Figure 16:
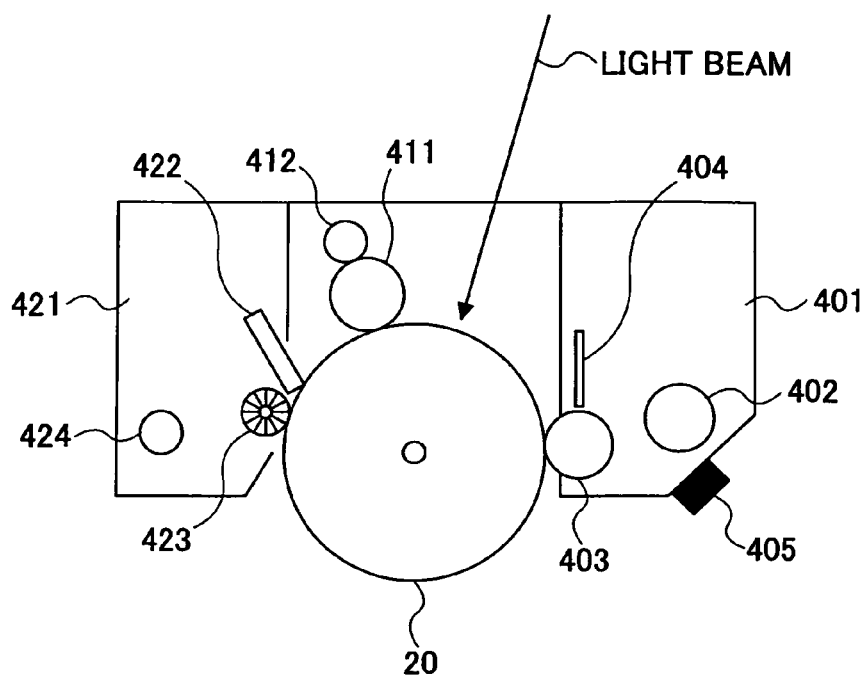
FIG. 16 is a schematic diagram illustrating a process cartridge according to an eighth embodiment of the present invention.

FIG. 16 is a schematic diagram illustrating a process cartridge into which the photosensitive body 20, a charging part, a development part, and a cleaning part are integrated according to this embodiment. This process cartridge is configured to be attachable to and detachable from the image forming apparatus shown in FIG. 4.

Toner conveyed from a toner cartridge (not graphically represented) to a development unit 401 is mixed with a developer by a conveyance screw 402 to be conveyed to a development roller 403 as an agent. The amount of the agent attached on the development roller 403 is controlled by a development doctor blade 404, and the agent is supplied onto the photosensitive body (photosensitive body drum) 20. The development unit 401 includes a toner density sensor 405, which detects the density of the toner in the agent and controls the toner density.

The photosensitive body drum 20 is charged by a charging roller 411. The charging roller 411 rotates so that the side of the charging roller 411 opposing the surface of the photosensitive body drum 20 moves in the same direction as the surface of the photosensitive body drum 20. The charging roller 411 charges the surface of the photosensitive body drum 20 evenly. A charge cleaning roller 412 is attached on the upper side of the charging roller 411. The charge cleaning roller 412 is provided together with the charging roller 411. The charge cleaning roller 412 cleans the charging roller 411.

Untransferred toner (remaining) on the photosensitive body drum 20 is collected by a cleaning blade 422 and a cleaning brush 423 of a cleaning unit 421. The cleaning blade 422 is attached in a direction to counter the photosensitive body drum 20. The cleaning blade 422 is provided together with the photosensitive body drum 20. The cleaning brush 423 rotates so that the side of the cleaning brush 423 opposing the surface of the photosensitive body drum 20 moves in the same direction as the surface of the photosensitive body drum 20. The cleaning brush 423, together with the cleaning blade 422, collects the untransferred toner, and conveys the untransferred toner to a waste toner conveyance coil 424. Waste toner is conveyed to a waste toner outlet (not graphically illustrated) by the waste toner conveyance coil 424, and is collected in a waste toner bottle (not graphically illustrated).

The point-to-point measurement and the control flow described above in the first through fourth embodiments are also applicable to the eighth embodiment.

Further, the configuration of this embodiment is applicable to the sixth and seventh embodiments. In this case, the process cartridge of this embodiment is provided for each color as an independent unit. The process cartridge may be configured to be attachable to and detachable from the image forming apparatuses shown in FIGS. 13 and 14.

Thus, according to the image forming apparatus of the eighth embodiment, by performing the point-to-point measurement described above in the first through fourth embodiments, a time difference can be measured with accuracy so that magnification error can be corrected with accuracy also with respect to the configuration of employing a detachable process cartridge.

Ninth Embodiment

Next, a description is given of an image forming apparatus according to a ninth embodiment of the present invention. The image forming apparatus of this embodiment is equal to those of the first through fourth embodiments in the general configuration of the light beam scanning device 10 and the image formation control part. In the image forming apparatus of the ninth embodiment, a detachable process cartridge including a memory storing the condition of the amount of light (a light amount condition) is employed.

Figure 17:
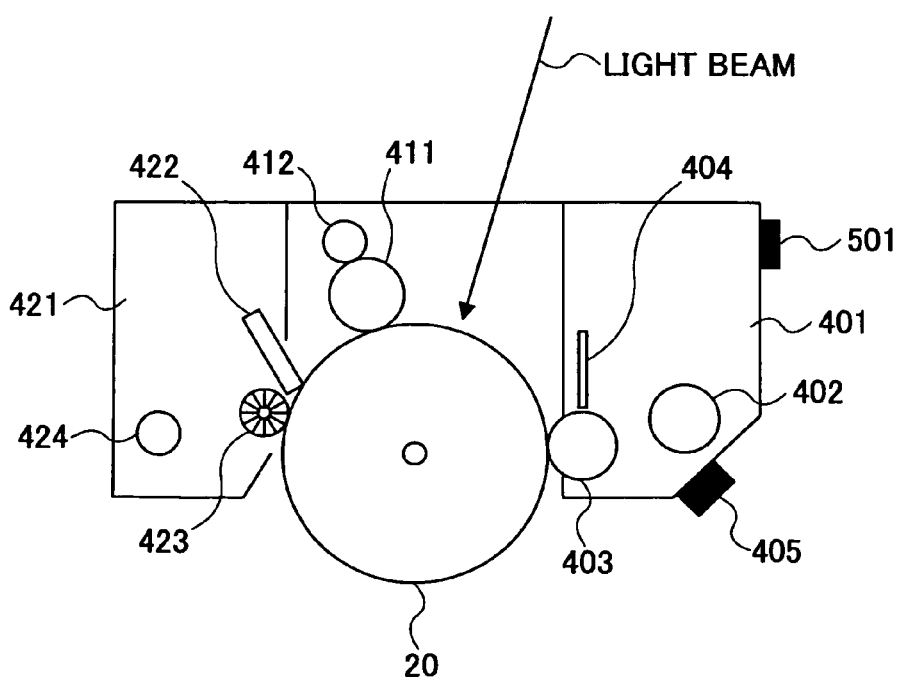
FIG. 17 is a schematic diagram illustrating a process cartridge according to a ninth embodiment of the present invention.

FIG. 17 is a schematic diagram illustrating a process cartridge into which the photosensitive body 20, a charging part, a development part, and a cleaning part are integrated according to this embodiment. The process cartridge of this embodiment is equal to that of the eighth embodiment except that a memory 501 storing the light amount condition at the time of image formation is provided.

Figure 18:
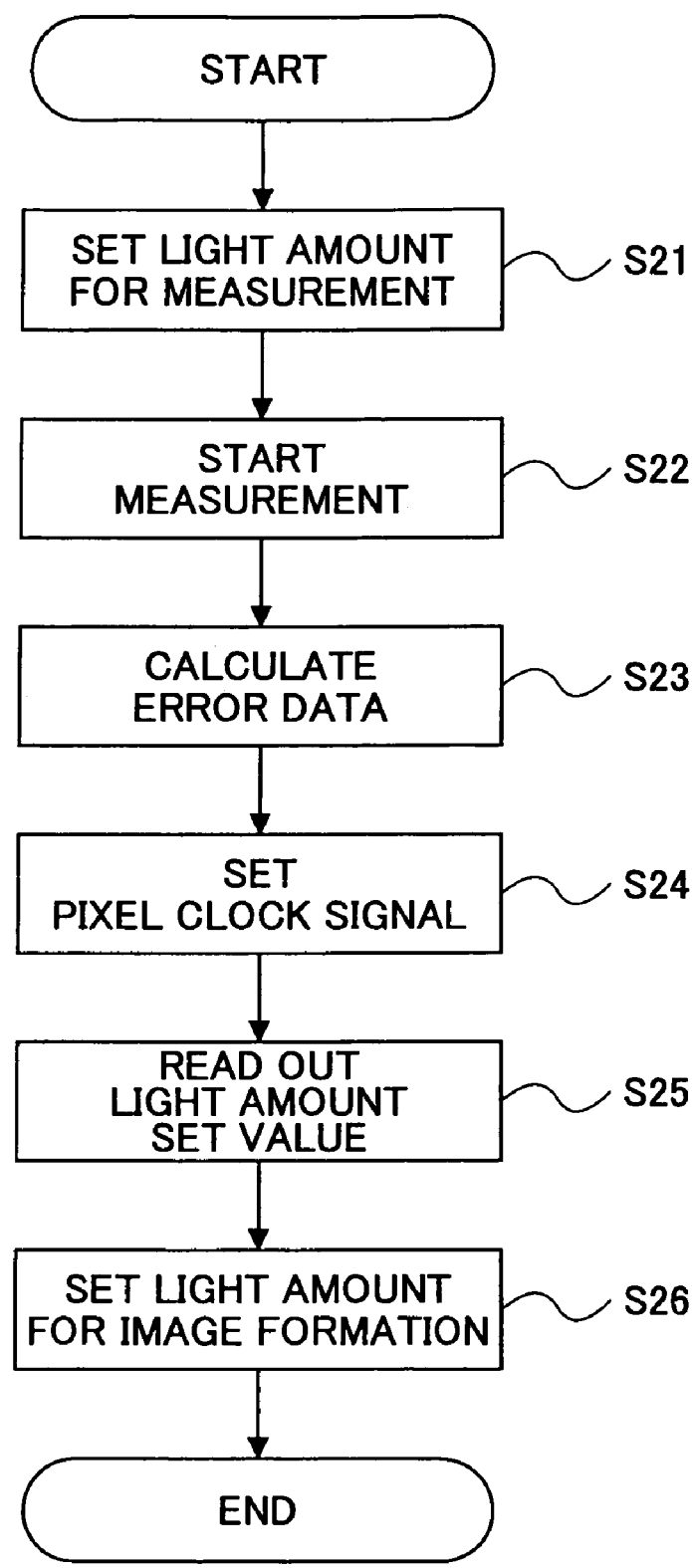
FIG. 18 is a flowchart illustrating a control flow in the case of performing the point-to-point measurement according to the ninth embodiment of the present invention.

FIG. 18 is a flowchart illustrating a control flow according to the ninth embodiment. Steps S21 through S24 of FIG. 18 are equal to steps S1 through S4 of FIG. 9. In step S25 of FIG. 18, a light amount set value stored in the memory 501 of the process cartridge is read out, and in step S26, the read-out value is set as the amount of light for image formation.

By storing the set value, even in the case of detaching the process cartridge from a main body, the set value can be reused when the process cartridge is reattached. Further, in the case of replacing the process cartridge with the process cartridge of another apparatus, a good image can be obtained by using a light amount set value stored therein.

The point-to-point measurement and the control flow described above in the first through fourth embodiments are also applicable in the ninth embodiment.

Further, the configuration of this embodiment is applicable to the sixth and seventh embodiments. In this case, the process cartridge of this embodiment is provided as an independent unit for each color. The process cartridge may be configured to be attachable to and detachable from the image forming apparatuses shown in FIGS. 13 and 14.

Thus, according to the image forming apparatus of the ninth embodiment, by performing the point-to-point measurement described above in the first through fourth embodiments, a time difference can be measured with accuracy so that magnification error can be corrected with accuracy also with respect to the configuration of employing a detachable process cartridge including a memory storing a light amount condition.

Further, by providing a storage part storing a light amount condition at the time of image formation to the process cartridge, a good image can be obtained at the time of replacing the process cartridge.

Tenth Embodiment

Next, a description is given of an image forming apparatus according to a tenth embodiment of the present invention. The image forming apparatus of this embodiment is equal to that of the above-described ninth embodiment in the general configuration of each part and the control flow. In the image forming apparatus of the tenth embodiment, the changing of a light amount set value can also be performed on the memory 501 storing a light amount condition.

In the case of changing the amount of light at the time of image formation because of process control, the passage of time, or environmental changes, a good image can be obtained by changing the condition stored in the memory

501 provided to the process cartridge. Thus, when a condition changes, an image is formed under the changed condition, and at the same time, the changing of the light amount set value is also performed on the memory 501 of the process cartridge.

Thus, according to the image forming apparatus of the tenth embodiment, even when the amount of light at the time of image formation changes, the point-to-point measurement according to the above-described ninth embodiment can be performed in accordance with the change. Accordingly, a time difference can be measured with accuracy so that magnification error can be corrected with accuracy.

11$^{th}$ Embodiment

Next, a description is given of an image forming apparatus according to an 11$^{th}$ embodiment of the present invention. The image forming apparatus of this embodiment is equal to those of the first through fourth embodiments in the general configuration of the light beam scanning device 10 and the image formation control part. In the image forming apparatus of the 11$^{th}$ embodiment, a detachable process cartridge divided into separate units is employed.

Figure 19:
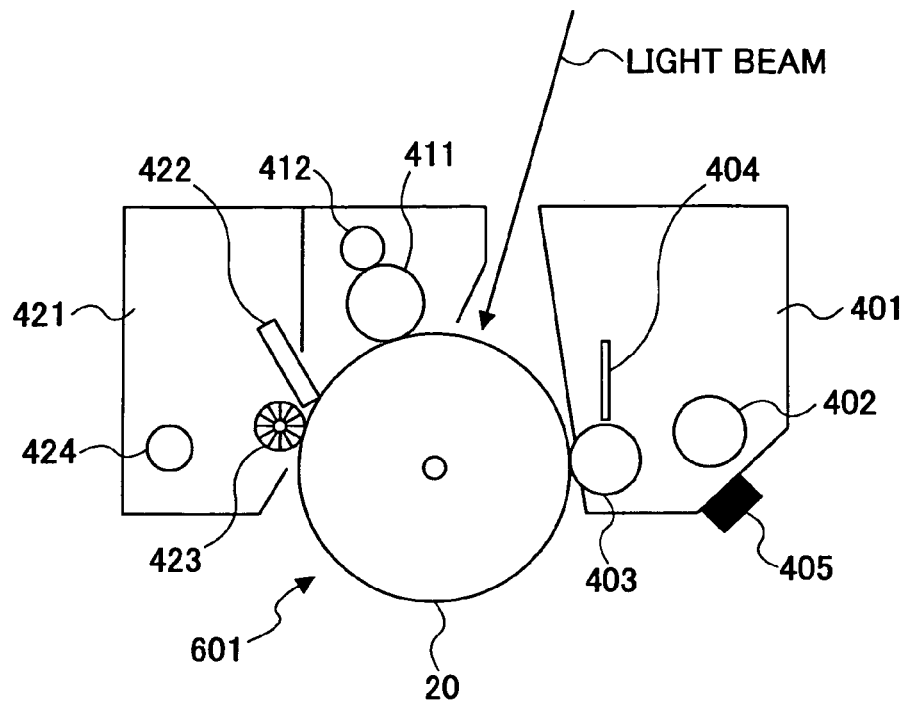
FIG. 19 is a schematic diagram illustrating a photosensitive body unit and a development unit according to an $11^{th}$ embodiment of the present invention.

FIG. 19 is a schematic diagram illustrating a process cartridge according to this embodiment. Referring to FIG. 19, the process cartridge of this embodiment is divided into a photosensitive body unit 601 (into which the photosensitive body 20, a charging part, and a cleaning part are integrated) and the development unit 401. The photosensitive body unit 601 and the development unit 401 are provided independently for each color. The photosensitive body unit 601 and the development unit 401 are configured to be attachable to and detachable from the image forming apparatus shown in FIG. 4.

With respect to the development unit 401, toner conveyed from a toner cartridge (not graphically represented) to the development unit 401 is mixed with a developer by the conveyance screw 402 to be conveyed to the development roller 403 as an agent. The amount of the agent attached on the development roller 403 is controlled by the development doctor blade 404, and the agent is supplied onto the photosensitive body (photosensitive body drum) 20. The development unit 401 includes the toner density sensor 405, which detects the density of the toner in the agent and controls the toner density.

With respect to the photosensitive body unit 601, the photosensitive body drum 20 is charged by the charging roller 411. The charging roller 411 rotates so that the side of the charging roller 411 opposing the surface of the photosensitive body drum 20 moves in the same direction as the surface of the photosensitive body drum 20. The charging roller 411 charges the surface of the photosensitive body drum 20 evenly. The charge cleaning roller 412 is attached on the upper side of the charging roller 411. The charge cleaning roller 412 is provided together with the charging roller 411. The charge cleaning roller 412 cleans the charging roller 411. Untransferred toner (remaining) on the photosensitive body drum 20 is collected by the cleaning blade 422 and the cleaning brush 423 of the cleaning unit 421. The cleaning blade 422 is attached in a direction to counter the photosensitive body drum 20. The cleaning blade 422 is provided together with the photosensitive body drum 20. The cleaning brush 423 rotates so that the side of the cleaning brush 423 opposing the surface of the photosensitive body drum 20 moves in the same direction as the surface of the photosensitive body drum 20. The cleaning brush 423, together with the cleaning blade 422, collects the untransferred toner, and conveys the untransferred toner to the waste toner conveyance coil 424. Waste toner is conveyed to a waste toner outlet (not graphically illustrated) by the waste toner conveyance coil 424, and is collected by a waste toner bottle (not graphically illustrated).

The point-to-point measurement and the control flow described above in the first through fourth embodiments are also applicable in the 11$^{th}$ embodiment.

Further, the configuration of this embodiment is applicable to the sixth and seventh embodiments. In this case, the process cartridge of this embodiment is provided for each color as an independent unit. The process cartridge may be configured to be attachable to and detachable from the image forming apparatuses shown in FIGS. 13 and 14.

Further, the configuration of this embodiment is also applicable to the fifth embodiment. In this case, the development unit 401 is provided as an independent unit for each color. The photosensitive body unit 601 and each development unit 401 may be configured to be attachable to and detachable from the image forming apparatus shown in FIG. 12.

Thus, according to the image forming apparatus of the 11$^{th}$ embodiment, by performing the point-to-point measurement described above in the first through fourth embodiments, a time difference can be measured with accuracy so that magnification error can be corrected with accuracy also with respect to the configuration of employing a detachable process cartridge divided into separate units.

12$^{th}$ Embodiment

Next, a description is given of an image forming apparatus according to a 12$^{th}$ embodiment of the present invention. The image forming apparatus of this embodiment is equal to those of the first through fourth embodiments in the general configuration of the light beam scanning device 10 and the image formation control part. In the image forming apparatus of the 12$^{th}$ embodiment, a detachable process cartridge that includes a memory storing the condition of the amount of light (a light amount condition) and is divided into separate units is employed.

Figure 20:
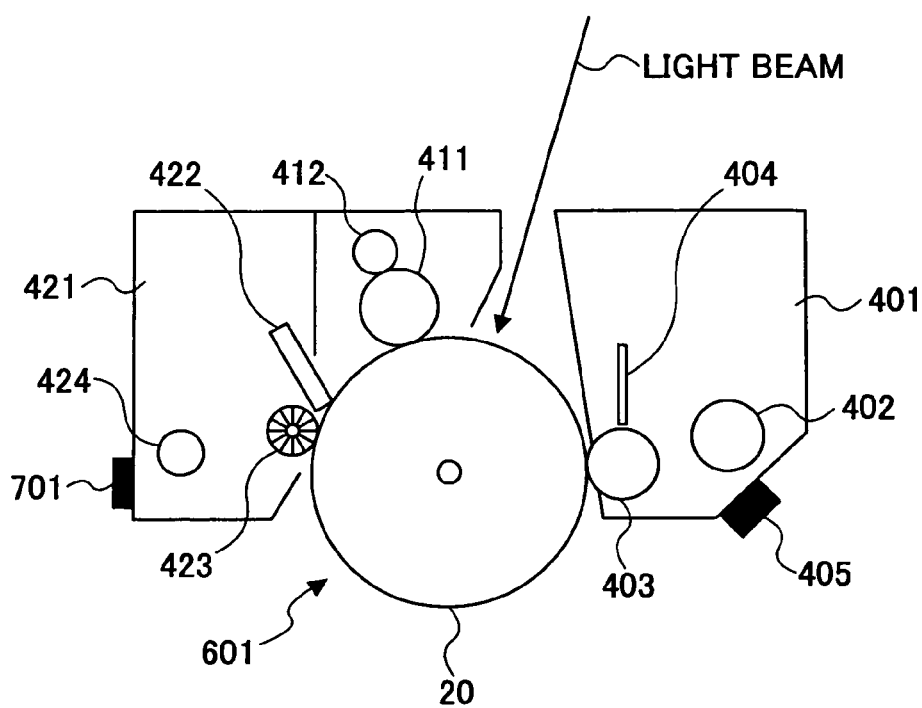
FIG. 20 is a schematic diagram illustrating the photosensitive body unit and the development unit according to a $12^{th}$ embodiment of the present invention.

FIG. 20 is a schematic diagram illustrating a process cartridge according to this embodiment. Referring to FIG. 20, the process cartridge of this embodiment is divided into the photosensitive body unit 601 (into which the photosensitive body 20, a charging part, and a cleaning part are integrated) and the development unit 401. The image forming apparatus of this embodiment is equal to that of the 11$^{th}$ embodiment except that a memory 701 storing a light amount condition at the time of image formation is provided to the photosensitive body unit 601.

The control flow of this embodiment is equal to that of the ninth embodiment shown in FIG. 18.

Also in this embodiment, by storing the set value, even in the case of detaching the process cartridge from a main body, the set value can be reused when the process cartridge is reattached. Further, in the case of replacing the process cartridge with the process cartridge of another apparatus, a good image can be obtained by using a light amount set value stored therein.

The point-to-point measurement and the control flow described above in the first through fourth embodiments are also applicable in the 11$^{th}$ embodiment.

Further, the configuration of this embodiment is applicable to the sixth and seventh embodiments. In this case, the process cartridge of this embodiment is provided as an independent unit for each color. The process cartridge may be configured to be attachable to and detachable from the image forming apparatuses shown in FIGS. 13 and 14.

Further, the configuration of this embodiment is also applicable to the fifth embodiment. In this case, the development unit 401 is provided as an independent unit for each color. The photosensitive body unit 601 and each development unit 401 may be configured to be attachable to and detachable from the image forming apparatus shown in FIG. 12.

Thus, according to the image forming apparatus of the ninth embodiment, by performing the point-to-point measurement described above in the first through fourth embodiments, a time difference can be measured with accuracy so that magnification error can be corrected with accuracy also with respect to the configuration of employing a detachable process cartridge that includes a memory storing a light amount condition and is divided into separate units.

Further, by providing a storage part storing a light amount condition at the time of image formation to the process cartridge, a good image can be obtained at the time of replacing the process cartridge.

13th Embodiment

Next, a description is given of an image forming apparatus according to a 13th embodiment of the present invention. The image forming apparatus of this embodiment is equal to that of the above-described 12th embodiment in the general configuration of each part and the control flow. In the image forming apparatus of the 13th embodiment, the changing of a light amount set value can also be performed on the memory 701 storing a light amount condition.

In the case of changing the amount of light at the time of image formation because of process control, the passage of time, or environmental changes, a good image can be obtained by changing the light amount condition stored in the memory 701 provided to the photosensitive body unit 601. Thus, when a condition changes, an image is formed under the changed condition, and at the same time, the changing of the light amount set value is also performed on the memory 701 of the photosensitive body unit 601.

Thus, according to the image forming apparatus of the 13th embodiment, even when the amount of light at the time of image formation changes, the point-to-point measurement according to the above-described 12th embodiment can be performed in accordance with the change. Accordingly, a time difference can be measured with accuracy so that magnification error can be corrected with accuracy.

Further, by recording a processing procedure for realizing light beam scanning by the image forming apparatus according to each of the above-described embodiments on a recording medium as a program, each of the above-described functions of each embodiment of the present invention can be realized by the program provided from the recording medium causing the CPU of a computer (such as an image forming apparatus or a PC connected thereto) forming a system to perform processing.

In this case, the present invention is applicable irrespective of whether information including the program is provided to the image forming apparatus by the above-described recording medium or from an external recording medium through a network.

That is, program code read out from the recording medium itself realizes a novel function of the present invention, and the recording medium storing the program code and a signal read out from the recording medium form the present invention.

As this recording medium, for instance, a floppy® disk, a hard disk, an optical disk, a magneto-optical disk, a CD-ROM, a CD-R, a magnetic tape, a nonvolatile memory card, a ROM, or an EEPROM may be employed.

According to the program of this embodiment, it is possible to cause an image forming apparatus controlled by the program to realize each function of the image forming apparatuses according to the above-described embodiments of the present invention.

The present invention is not limited to the specifically disclosed embodiments, and variations and modifications may be made without departing from the scope of the present invention.

The present application is based on Japanese Priority Patent Application No. 2004-011188, filed on Jan. 19, 2004, the entire contents of which are hereby incorporated by reference.

What is claimed is:

1. A light beam scanning device, comprising:
a light emission source configured to emit a light beam with which the light beam scanning device performs scanning;
a deflection part configured to deflect the light beam emitted from the light emission source in a main scanning direction with a plurality of deflection surfaces thereof;
first and second light beam detection parts configured to detect the light beam deflected by the deflection part at first and second positions, respectively, outside an image area on opposite sides thereof in the main scanning direction;
a time difference measurement part configured to measure a time difference between the detection of the light beam by the first light beam detection part and the detection of the light beam by the second light beam detection part; and
a control part configured to perform control so as to correct image magnification in the main scanning direction in the image area from the time difference measured by the time difference measurement part,
wherein the control part performs control so that an amount of light of the light beam at a time of detecting the light beam by the first and second light beam detection parts is constant.

2. The light beam scanning device as claimed in claim 1, wherein the control part controls the amount of light of the light beam entering the first light beam detection part and the amount of light of the light beam entering the second light beam detection part to a same predetermined value.

3. The light beam scanning device as claimed in claim 2, wherein the predetermined value of the amount of light of the light beam controlled by the control part is a maximum value employed by the light beam scanning device.

4. The light beam scanning device as claimed in claim 2, wherein the predetermined value of the amount of light of the light beam controlled by the control part is a medium value of a range within which the amount of light is varied by the light beam scanning device.

5. The light beam scanning device as claimed in claim 1, wherein the control part controls the amount of light of the light beam at a position where the light beam enters the first light beam detection part and the amount of light of the light beam at a position where the light beam enters the second light beam detection part to first and second different predetermined values, respectively.

6. An image forming apparatus, comprising:
a light beam scanning device as set forth in claim 1; and an image carrying body configured to rotate or move in a sub scanning direction, wherein an image is formed by the light beam scanning device causing the light beam according to image data to scan a surface of the image carrying body.

7. The image forming apparatus as claimed in claim 6, further comprising:

a charging part configured to charge the surface of the image carrying body;

a development part configured to develop a latent image formed on the image carrying body by the scanning of the light beam from the light beam scanning device; and a cleaning part configured to clean the surface of the image carrying body, wherein:

the image carrying body is combined with at least one of the charging part, the development part, and the cleaning part to be formed into a process cartridge provided detachably to a main body of the image forming apparatus;

the process cartridge includes a storage part configured to store a value of the amount of light to be set at the time of forming the image; and the control part of the light beam scanning device sets the amount of light to the value stored in the storage part at the time of forming the image.

8. The image forming apparatus as claimed in claim 7, wherein on changing the amount of light according to the light emission source at the time of forming the image, the changed amount of light is stored in the storage part of the process cartridge.

9. The image forming apparatus as claimed in claim 6, further comprising:

a charging part configured to charge the surface of the image carrying body;

a development part configured to develop a latent image formed on the image carrying body by the scanning of the light beam from the light beam scanning device; and a cleaning part configured to clean the surface of the image carrying body, wherein:

at least one of the charging part and the cleaning part and the image carrying body are combined into a photosensitive body unit;

the development part is included in a development unit;

the photosensitive body unit and the development unit are provided detachably to a main body of the image forming,apparatus;

the photosensitive body unit includes a storage part configured to store a value of the amount of light to be set at the time of forming the image; and the control part of the light beam scanning device sets the amount of light to the value stored in the storage part at the time of forming the image.

10. The image forming apparatus as claimed in claim 9, wherein on changing the amount of light according to the light emission source at the time of forming the image, the changed amount of light is stored in the storage part of the photosensitive body unit.

11. The image forming apparatus as claimed in claim 6, wherein the control part of the light beam scanning device performs shading correction at the time of forming the image.

12. The image forming apparatus as claimed in claim 6, wherein the control part of the light beam scanning device controls the amount of light of the light beam entering the first light beam detection part and the amount of light of the light beam entering the second light beam detection part to a same predetermined value.

13. The image forming apparatus as claimed in claim 12, wherein the predetermined value of the amount of light of the light beam controlled by the control part of the light beam scanning device is a maximum value employed by the light beam scanning device.

14. The image forming apparatus as claimed in claim 12, wherein the predetermined value of the amount of light of the light beam controlled by the control part of the light beam scanning device is a medium value of a range within which the amount of light is varied by the light beam scanning device.

15. The image forming apparatus as claimed in claim 6, wherein the control part of the light beam scanning device controls the amount of light of the light beam at a position where the light beam enters the first light beam detection part and the amount of light of the light beam at a position where the light beam enters the second light beam detection part to first and second different predetermined values, respectively.

16. A light beam scanning method in a device including a light emission source configured to emit a light beam and a deflection part configured to deflect the light beam emitted from the light emission source in a main scanning direction with a plurality of deflection surfaces thereof, the light beam scanning method comprising the steps of:

(a) detecting the light beam deflected by the deflection part at first and second positions, respectively, outside an image area on opposite sides thereof in the main scanning direction;

(b) measuring a time difference between the detection of the light beam at the first position and the detection of the light beam at the second position; and (c) performing control so as to correct image magnification in the main scanning direction in the image area from the time difference measured in said step (b), and performing scanning, wherein an amount of light of the light beam at a time of detecting the light beam in said step (a) is constant.

17. The light beam scanning method as claimed in claim 16, wherein the amount of light of the light beam at the time of detecting the light beam at the first position and the amount of light of the light beam at the time of detecting the light beam at the second position in said step (a) are set to a same predetermined value.

18. The light beam scanning method as claimed in claim 17, wherein the predetermined value of the amount of light of the light beam at the time of detecting the light beam in said step (a) is a maximum value employable in said step (c).

19. The light beam scanning method as claimed in claim 17, wherein the predetermined value of the amount of light of the light beam at the time of detecting the light beam in said step (a) is a medium value of a range within which the amount of light is variable in said step (c).

20. The light beam scanning method as claimed in claim 16, wherein the amount of light of the light beam at the time of detecting the light beam at the first position and the amount of light of the light beam at the time of detecting the light beam at the second position in said step (a) are set to first and second different predetermined values, respectively.

21. A computer-readable recording medium on which a program for causing a computer to execute a light beam scanning method as set forth in claim 16 is recorded.

22. The computer-readable recording medium as claimed in claim 21, wherein the amount of light of the light beam at the time of detecting the light beam at the first position and the amount of light of the light beam at the time of detecting the light beam at the second position in said step (a) of the light beam scanning method are set to a same predetermined value.

23. The computer-readable recording medium as claimed in claim 22, wherein the predetermined value of the amount of light of the light beam at the time of detecting the light beam in said step (a) of the light beam scanning method is a maximum value employable in said step (c) of the light beam scanning method.

24. The computer-readable recording medium as claimed in claim 22, wherein the predetermined value of the amount of light of the light beam at the time of detecting the light beam in said step (a) of the light beam scanning method is a medium value of a range within which the amount of light is variable in said step (c) of the light beam scanning method.

25. The computer-readable recording medium as claimed in claim 21, wherein the amount of light of the light beam at the time of detecting the light beam at the first position and the amount of light of the light beam at the time of detecting the light beam at the second position in said step (a) of the light beam scanning method are set to first and second different predetermined values, respectively.

* * * * *